US012694596B2

(12) United States Patent
Tran et al.

(10) Patent No.: US 12,694,596 B2
(45) Date of Patent: Jul. 28, 2026

(54) RIGID ACCESSORY ADJUSTMENT

(71) Applicant: Roblox Corporation, San Mateo, CA (US)

(72) Inventors: Brandon Tran, San Mateo, CA (US); David Sapienza, San Mateo, CA (US); Alexander Ehrath, San Mateo, CA (US); Faraz Baghernezhad, San Mateo, CA (US); Jared Kirk, San Mateo, CA (US); Priyal Mehta, San Mateo, CA (US); Liz Gatapia, San Mateo, CA (US); Padi Yi Tang, San Mateo, CA (US)

(73) Assignee: Roblox Corporation, San Mateo, CA (US)

( * ) Notice: Subject to any disclaimer, the term of this patent is extended or adjusted under 35 U.S.C. 154(b) by 141 days.

(21) Appl. No.: 18/826,487

(22) Filed: Sep. 6, 2024

(65) Prior Publication Data

US 2025/0086872 A1 Mar. 13, 2025

Related U.S. Application Data

(60) Provisional application No. 63/681,422, filed on Aug. 9, 2024, provisional application No. 63/537,027, filed on Sep. 7, 2023.

(51) Int. Cl.
*G06T 13/40* (2011.01)
*G06T 19/20* (2011.01)

(52) U.S. Cl.
CPC .............. *G06T 13/40* (2013.01); *G06T 19/20* (2013.01); *G06T 2219/2016* (2013.01)

(58) Field of Classification Search
CPC . G06T 13/40; G06T 19/20; G06T 2219/2016; G06T 13/20; G06T 2219/2004
See application file for complete search history.

(56) References Cited

U.S. PATENT DOCUMENTS

2015/0066189 A1* 3/2015 Mulligan ........... G06Q 30/0621
                                                       700/136
2023/0090253 A1* 3/2023 Meadows ............... H04L 67/12
                                                       345/419
(Continued)

FOREIGN PATENT DOCUMENTS

WO WO-2019216999 A1 * 11/2019 ......... G06F 3/04883

OTHER PUBLICATIONS

Claw Studio, [Moves!] Black Mech Arms Suit, Oct. 23, 2022, pp. 1-2 (Year: 2022).*

(Continued)

*Primary Examiner* — Michael J Jansen, II
(74) *Attorney, Agent, or Firm* — IP Spring

(57) ABSTRACT

Rigid accessory adjustment provides dynamic manipulation of accessories, such as clothing items, headgear, weapons, and ornaments, attached to virtual game three-dimensional (3D) avatars. The rigid accessories maintain a constant shape, allowing players to fine-tune the position, rotation, and scaling of accessories. An accessory adjustment tool is used for fitting or styling of rigid accessories on 3D avatars, including changing position, rotation, and scaling of the rigid accessories. The rigid accessory adjustment include providing an avatar in a 3D virtual environment, providing a rigid accessory for the avatar body, performing at least one adjustment from the group comprising adjusting a position, adjusting a rotation, and adjusting a scale of the rigid accessory relative to the avatar body, and animating the avatar body, wherein the rigid accessory animates in correspondence with the animated avatar body.

17 Claims, 25 Drawing Sheets

(56) References Cited

U.S. PATENT DOCUMENTS

| | | | | |
|---|---|---|---|---|
| 2024/0193836 A1* | 6/2024 | Stemple | ............... | G06V 40/168 |
| 2025/0086872 A1* | 3/2025 | Tran | ........................ | G06T 13/40 |
| 2025/0157152 A1* | 5/2025 | Kunz | ...................... | G06T 17/20 |

OTHER PUBLICATIONS

SharkBlox, You Can Now Wear Accessories Backwards! Rotate Hats 180° For Free! (ROBLOX), Published Date: Sep. 1, 2023, Video Most relevant time period: 0:41-0:54, https://www.youtube.com/watch?v=YJoJfc1lCmU (Year: 2023).*
Bloxy News, New head and accessory adjustment features are coming to the #Roblox Avatar Editor, Jul. 29, 2023, See Entire Video, https://www.youtube.com/shorts/Gm_yOwzWqoA?feature=share (Year: 2023).*
SharkBlox, This Roblox Accessory Can Move!? (UGC Mech Arms), Nov. 13, 2022, Video Most relevant time period: 2:30-2:46, https://www.youtube.com/watch?v=AAzqQXoAKfU (Year: 2022).*
IKawai, Title: You Can Move Accessories Now! (Roblox Updates), Published Date: Sep. 1, 2023 Most relevant time period: 0:41, https://www.youtube.com/watch?v=YJoJfc1lCmU (Year: 2023).*

* cited by examiner

100a

102

104

106

100b

108

Brown Bag
(1.0)

110

112

Brown Bag
(3.0)

```
{
    "assets": [
    {
        "id": 0,
        "meta": 0 {
            "order": 0,
            "puffiness": 0,
            "version": 0,
            "position":  {
                "x": 0.0,
                "y": 0.0,
                "z": 0.0,
            }
            "rotation":  {
                "x": 0.0,
                "y": 0.0,
                "z": 0.0,
            }
            "scale":  {
                "scale": 0.0,
            }
        }
    }
    ]
}
```

602

604

606

608

610

700

800

900

1200

1300a

1300b

1300c

ACCESSORY ADJUSTMENT HAT BOUNDS

1334

EXISTING UGC HAT BOUNDS

1332

1330

1300d

ACCESSORY ADJUSTMENT
HAT BOUNDS
1344

EXISTING UGC HAT BOUNDS
1342

1340

1300e

RIGID ACCESSORY ADJUSTMENT

CROSS-REFERENCE TO RELATED APPLICATIONS

This application claims priority to U.S. Provisional Application No. 63/537,027, entitled "RIGID ACCESSORY ADJUSTMENT," filed on Sep. 7, 2023 and U.S. Provisional Application No. 63/681,422, entitled "RIGID ACCESSORY ADJUSTMENT," filed on Aug. 9, 2024, the content of which are incorporated herein in their entirety.

TECHNICAL FIELD

This disclosure relates generally to computer-based virtual environments, and more particularly but not exclusively, relates to methods, systems, and computer readable media to provide an accessory adjustment tool for fitting or styling of rigid accessories on three-dimensional (3D) avatars including changing position, rotation, and scaling of the rigid accessories.

BACKGROUND

Avatars of various shapes and styles, including humanoid avatars can be provided in a virtual environment. Avatars can correspond to users (players) of the virtual environment as well as non-playing characters. An avatar can include a head and a body, and can wear accessories such as shoes, clothing, jewelry, headgear, etc.

The application of rigid accessories to avatars with diverse body shapes, head sizes, and other simultaneously worn accessories frequently leads to compatibility challenges. Additionally, players may wish to wear these accessories in unconventional orientations, which is often difficult. These limitations noticeably curtail the diversity of options available to users for expressing themselves on the platform, consequently constraining their creative liberties and personalization possibilities. A scalable accessory system permits players to easily and intuitively create any avatar and add rigid accessories to the avatar.

Thus, a player may want to represent their identity through their avatar's appearance but the player's options may be limited depending on the avatar's head/body shape and existing equipped accessories. Likewise, a creator wishes to be able to easily make accessories that can be worn by every player (i.e., on arbitrary avatars).

Some implementations were conceived in light of the above.

The background description provided herein is for the purpose of presenting the context of the disclosure. Work of the presently named inventors, to the extent it is described in this background section, as well as aspects of the description that may not otherwise qualify as prior art at the time of filing, are neither expressly nor impliedly admitted as prior art against the prior disclosure.

SUMMARY

Implementations of the present disclosure relate to providing an accessory adjustment tool for adjusting rigid accessories (e.g., items of accessories such as a cap or sunglasses fitted onto the avatar body) on three-dimensional (3D) avatars, including changing position, rotation, and scaling of the rigid accessories. For example, the adjusting uses a variety of techniques to obtain high quality results while making it easy for a user to make the adjustments.

For example, the techniques may include providing an avatar in a 3D virtual environment, the avatar having an avatar body, providing a rigid accessory for the avatar body, the rigid accessory being attached to the avatar body, performing an adjustment including at least one of a position, a rotation, and a scale of the rigid accessory relative to the avatar body, and animating the avatar body, where the rigid accessory for the avatar body animates in correspondence with the animated avatar body.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by a data processing apparatus, cause the apparatus to perform the actions.

According to one aspect, a computer-implemented method to provide rigid accessory adjustment for an avatar body in a three-dimensional (3D) virtual environment is provided, the computer-implemented method comprising: providing an avatar in the 3D virtual environment, the avatar having the avatar body; providing a rigid accessory for the avatar body, wherein the rigid accessory is attached to the avatar body; performing at least one adjustment from the group comprising: adjusting a position of the rigid accessory relative to the avatar body, adjusting a rotation of the rigid accessory relative to the avatar body, adjusting a scale of the rigid accessory relative to the avatar body, and a combination thereof; and animating the avatar body, wherein the rigid accessory for the avatar body animates in correspondence with the animated avatar body.

Various implementations of the computer-implemented method are described herein.

In some implementations, the rigid accessory is associated with an accessory type, and the computer-implemented method further comprises identifying constraints for the rigid accessory based at least in part on the accessory type, wherein the constraints limit the at least one adjustment.

In some implementations, the computer-implemented method further comprises analyzing the at least one adjustment to remove abusive adjustments to the rigid accessory.

In some implementations, performing the at least one adjustment comprises performing at least two adjustments, and each adjustment is performed independently from other adjustments.

In some implementations, the position of the rigid accessory and the rotation of the rigid accessory are adjusted by modifying a frame of the rigid accessory, the position of the rigid accessory is associated with adjustments along at least one of an x-axis, a y-axis, and a z-axis, and the rotation of the rigid accessory is associated with adjustments along at least one of: the x-axis, the y-axis, and the z-axis.

In some implementations, the scale of the rigid accessory is adjusted by changing a size of the rigid accessory, wherein performing the adjustment to the scale of the rigid accessory is associated with uniform adjustments along an x-axis, a y-axis, and a z-axis.

In some implementations, the rigid accessory is associated with an asset ID in the 3D virtual environment and the at least one adjustment is stored as metadata in a field associated with the rigid accessory in the 3D virtual environment using the asset ID.

In some implementations, the at least one adjustment is accessed by retrieving the stored metadata in the field associated with the rigid accessory in the 3D virtual environment using the asset ID, wherein the animating comprises using the stored metadata to animate the rigid accessory in correspondence with the animated avatar body.

In some implementations, each adjustment of the position, the rotation, and the scale is stored as the metadata as a percentage of a corresponding allowed adjustment constraint and as absolute values of limits of a corresponding adjustment constraint according to a distance measure in the 3D virtual environment.

In some implementations, the computer-implemented method further comprises animating the rigid accessory in correspondence with the animated avatar body, wherein animating the rigid accessory is performed based on the percentage of the corresponding allowed adjustment constraint and the absolute values of the limits of the corresponding adjustment constraint according to the distance measure in the 3D virtual environment in the metadata.

According to another aspect, a non-transitory computer-readable medium is provided. The non-transitory computer-readable medium has instructions stored thereon that, responsive to execution by a processing device, causes the processing device to perform operations comprising: providing an avatar in a 3D virtual environment, the avatar having an avatar body; providing a rigid accessory for the avatar body, wherein the rigid accessory is attached to the avatar body; performing at least one adjustment from the group comprising: adjusting a position of the rigid accessory relative to the avatar body, adjusting a rotation of the rigid accessory relative to the avatar body, adjusting a scale of the rigid accessory relative to the avatar body, and a combination thereof; and animating the avatar body, wherein the rigid accessory for the avatar body animates in correspondence with the animated avatar body.

Various implementations of the non-transitory computer-readable medium are described herein.

In some implementations, the rigid accessory is associated with an accessory type, and wherein the operations further comprise identifying constraints for the rigid accessory based at least in part on the accessory type, wherein the constraints limit the at least one adjustment.

In some implementations, the operations further comprise analyzing the at least one adjustment to remove abusive adjustments to the rigid accessory.

In some implementations, performing the at least one adjustment comprises performing at least two adjustments, and wherein each adjustment is performed independently from other adjustments.

In some implementations, the rigid accessory is associated with an asset ID in the 3D virtual environment and the at least one adjustment is stored as metadata in a field associated with the rigid accessory in the 3D virtual environment using the asset ID.

According to another aspect, a system is disclosed, comprising: a memory with instructions stored thereon; and a processing device, coupled to the memory, the processing device configured to access the memory, wherein the instructions when executed by the processing device cause the processing device to perform operations comprising: providing an avatar in a 3D virtual environment, the avatar having an avatar body; providing a rigid accessory for the avatar body, wherein the rigid accessory is attached to the avatar body; performing at least one adjustment from the group comprising: adjusting a position of the rigid accessory relative to the avatar body, adjusting a rotation of the rigid accessory relative to the avatar body, adjusting a scale of the rigid accessory relative to the avatar body, and a combination thereof; and animating the avatar body, wherein the rigid accessory for the avatar body animates in correspondence with the animated avatar body.

Various implementations of the system are described herein.

In some implementations, the rigid accessory is associated with an accessory type, and the operations further comprise constraints for the rigid accessory based at least in part on the accessory type, wherein the constraints limit the at least one adjustment.

In some implementations, the operations further comprise analyzing the at least one adjustment to remove abusive adjustments to the rigid accessory.

In some implementations, performing the at least one adjustment comprises performing at least two adjustments, and wherein each adjustment is performed independently from other adjustments.

In some implementations, the rigid accessory is associated with an asset ID in the 3D virtual environment and the at least one adjustment is stored as metadata in a field associated with the rigid accessory in the 3D virtual environment using the asset ID.

According to yet another aspect, portions, features, and implementation details of the systems, methods, and non-transitory computer-readable media may be combined to form additional aspects, including some aspects which omit and/or modify some or portions of individual components or features, include additional components or features, and/or other modifications, and all such modifications are within the scope of this disclosure.

BRIEF DESCRIPTION OF THE DRAWINGS

FIG. 3A illustrates a screenshot of an example interface for accessory refinement with respect to position prior to adjustment, in accordance with some implementations.

DETAILED DESCRIPTION

Figure 1A:
FIG. 1A illustrates several examples of rigid accessories having poor fits, in accordance with some implementations.
Figure 1A:
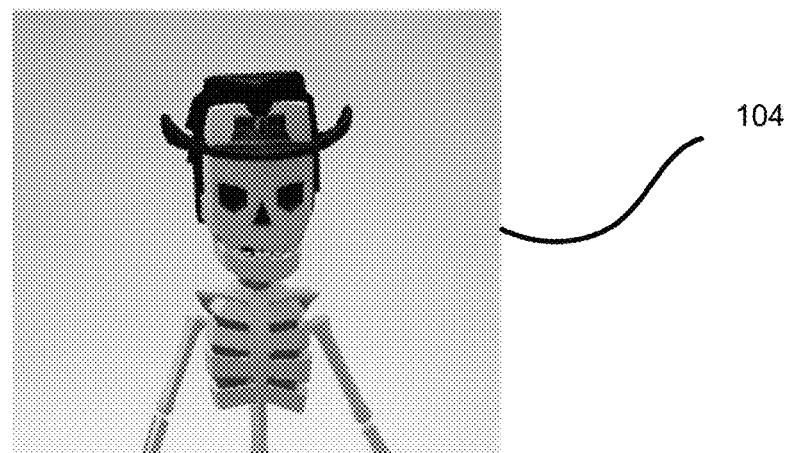
Figure 1A:
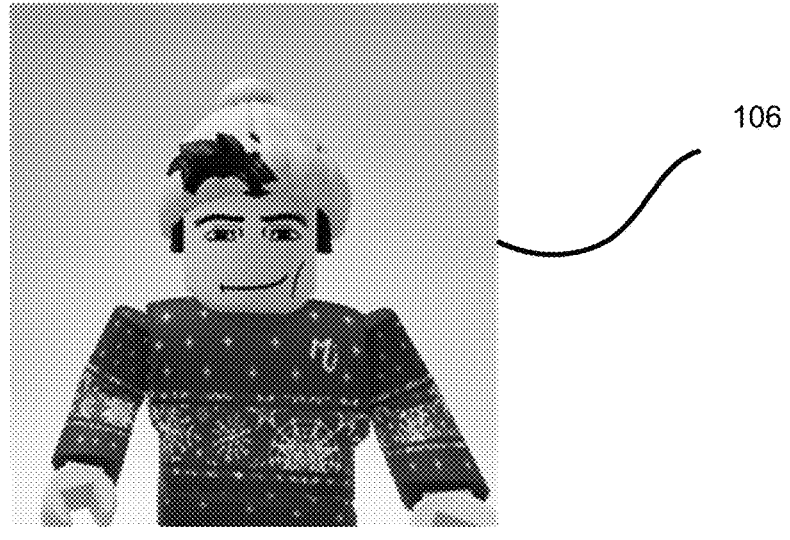

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are contemplated herein.

References in the specification to "one implementation," "an implementation," "an example implementation," etc. indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, such feature, structure, or characteristic may be effected in connection with other implementations whether or not explicitly described.

The present disclosure is directed towards, inter alia, techniques to provide an accessory adjustment tool for adjusting rigid accessories (e.g., items of accessories like a cap or sunglasses fitted on the avatar body) on three-dimensional (3D) avatars including changing position, rotation, and scaling of the rigid accessories. The techniques provide a way to fit pre-designed accessories onto avatar bodies and heads of arbitrary shapes and sizes while ensuring the accessory provides a correct appearance and is not policy violative.

The technical solution provided herein is that the rigid accessory is automatically adjusted (position/rotation/scale) relative to the avatar body (within preset limits). There are additional aspects of identifying constraints based on accessory type, preserving safety, and making multiple mutually independent adjustments.

The technical benefits may include that duplicative accessories are eliminated because creators do not need to provide different versions for different avatar bodies/head (saving storage resources, improving search results, saving creator effort, etc.). There may also be better virtual experience rendering because accessories fit better and can be fit in arbitrary ways without requiring creator effort. There may also be improved safety through automatic evaluation of accessory adjustment.

The rigid accessories are static meshes that fit on the avatars based on a positional offset without any deformation. Rigid accessories attach to a specific attachment point of an avatar and remain static in that position and orientation. The term adjustment refers to the capability to make changes or modifications to an accessory.

Rigid accessories do not fit correctly when applied onto various avatars having different bodies, head shapes, and/or other worn accessories. Players may also want to have avatars that wear an accessory in different orientations (e.g., a hat facing forward, backward, or sideways) but current avatar and accessory setup is limited to preconfigured orientations for an accessory and does not support arbitrary orientations. This limitation lowers the number of options available for self-expression on a 3D virtual environment platform. In some implementations, features are provided that allow players to fix the fitting issues associated with rigid accessories and creatively wear their accessories in different orientations.

Accessory adjustment encompasses several aspects. The adjustment may include adjusting the position of an accessory. Position includes the ability to move the accessory around on the avatar's body. For example, position may include repositioning a hat so that the hat sits at a different angle on the avatar's head. The adjustment may include rotation of an accessory. Rotation includes the ability to adjust the orientation or angle of the accessory. For example, rotation may include tilting a weapon or changing the angle of a pair of sunglasses. The adjustment may include scaling. Scaling may include the ability to alter the size or scale of the accessory. For instance, scaling may include resizing a necklace to make the necklace larger or smaller on the avatar's neck. In various implementations and for various accessories, any combination of accessory position adjustment, rotation adjustment, scaling adjustment, etc. can be supported.

The accessory adjustment tool permits users to assign a body attachment point to the accessory on an avatar and then adjust the position, rotation, and/or scale of rigid accessories. The accessories can be adjusted in both a virtual store associated with purchases for a virtual environment (e.g., where accessories can be purchased and/or tried on in a test environment) and a virtual editor associated with making changes in a virtual environment (e.g., where accessories can be designed). In some implementations, accessories may also be adjusted using a web editor interface.

When fitting the rigid accessories, a bounding area appears around an accessory indicating a possible placement of a specific type of accessory on the avatar. The user may position, rotate, and scale accessories within this bounding area to ensure that the accessory fits on the avatar properly. A coordinate frame (describing a 3D position and orientation) of an accessory attachment is adjusted for changing position and rotation of the rigid accessories. A size of a handle of an accessory is adjusted for scaling of the rigid accessories.

Avatar configurations may support any combination of avatar (body shape and other attributes) and accessory such that where everything (i.e., every accessory) works for every player (i.e., every avatar and/or in combination with other accessories). This increases opportunities for player self-expression through greater numbers of possible combinations of accessories, makes the accessory refinement process intuitive and enjoyable for players, and can reduce redundancy for user-generated content (UGC) catalog creators. Another aspect is to introduce users that participate in virtual experiences to a design environment (e.g., a design studio user interface) such that they can become creators that generate or customize accessories.

Various implementations provide an accessory adjusting tool and/or environment that provides players and creators with specific capabilities that help them effectively manipulate accessories to improve accessory fit to arbitrary avatars and accessory animation quality and avoid the necessity of duplicate accessories (e.g. versions with different scale or rotation).

Providing these capabilities empowers players to have more control over avatars through accessory refinements. Players are provided with a much larger number of possible accessory combinations. Hence, users are empowered to create avatars without being constrained by limits on options to change body shapes, outer clothing, etc. The techniques empower users to be creative within certain bounds (e.g., determined based on creator-specified settings/parameters). The bounds can ensure that detrimental results are not obtained as a result of accessory adjustment. The described implementations provide a user-friendly, intuitive, and simple user experience for accessory adjustment. This approach also makes it possible to perform refinement of existing accessories in lieu of creation of new ones. Such a result makes it much more efficient and manageable to manage accessories with only minor variations (such as a hat that may be worn in various orientations and/or positions).

Accessory adjustment features for rigid accessories are provided. In some implementations, such features are provided as a player-facing tool, such as within an editor program and/or a store program, that permits players to move, rotate, and scale accessories, whether for fitting or style, constrained by asset type and moderation bounds. In some implementations, it may be possible to automatically fit accessories or automatically pre-fit accessories and then allow players to adjust further.

For example, the adjustment of accessories may be performed using a hybrid model, utilizing gimbals and/or sliders. Gimbals refer to a mechanism that permits a body to incline freely in any direction or suspends it so that it will remain level when its support is tipped. Such gimbals may be used to adjust an orientation of a given object. Sliders, also known as a track bar, refer to a type of graphical user interface (GUI) control. A slider is a graphical control element that allows a user to select a value or adjust a setting by moving a handle along a track. The user interface may provide a reset button that permits a user to revert to default values (i.e., for position, rotation, and scale) for any accessory submitted as user-generated content (UGC). The user interface may also provide a save button that stores the adjustments to the accessory.

In some implementations, adjustments may not be saved until the player selects the save button. However, in other implementations, there may be an auto-save feature that saves adjustments at regular time intervals. When saving, the accessory refinements may save to players' custom costumes.

Rigid accessory adjustment features may include certain moderation features. For example, the moderation may proactively limit accessory adjustments within bounds, per asset type. The moderation may also reactively moderate bad adjustments by reporting bad adjustments. Such bad adjustments may include inappropriate, malicious, or abusive adjustments. For example, the adjustments may cause an accessory that previously rendered without issues to include inappropriate content.

For example, certain accessories may not display offensive or inappropriate portions (or more generally, any content that violates platform policies of the virtual environment, and/or applicable laws or regulations) in their original form, but if adjusted may include offensive material. Some text or graphics may not be violative originally, but if rotated or otherwise adjusted may display new material that is violative of the policy, e.g., abusive and/or offensive. When such adjustments are detected, various steps may be taken to remove the adjustments and/or restrict access to players who attempt to make such adjustments.

For example, violative adjustments may be handled such that the method of making the adjustments further comprises analyzing the at least one adjustment being made to remove abusive (or other violative) adjustments to the rigid accessory. For example, the analyzing could include testing potentially abusive content against a checklist used to identify abusive content, either prior to or after implementing an adjustment. Alternatively, abusive (or other violative) content may be detected based on reports from other users or by providing a moderation pipelines to review trust and safety checks. If the abusive content is identified prior to implementation, it can be blocked. If the abusive content is identified after implementation, it can be reversed or removed.

If an abusive player is detected, in some implementations, a script may be run to reset an adjustment to zero (or unequip offending assets), restoring the accessory to a neutral state. Additional measures may be enacted in response to detecting an abusive player, such as removing the player from an experience or placing other restrictions on their access to a virtual environment. In some implementations, certain assets may be prevented from being adjusted. At the asset level, some accessories can have adjustment capability removed as an option if players frequently abuse these accessories via adjustment.

At a backend, certain data is stored and manipulated to support the adjustment of accessories. For example, information used for accessory adjustment may include position, rotation, and scale per accessory that is adjusted. Accessories that are layered clothing (where one or more layers of accessories are applied over an avatar body, with some layers overlapping others) may include more information, such as puffiness information. Two new items may be stored in the backend for each adjustment type. First, an amount of the allowed adjustment in the backend. This may be stored as a percentage from –1 (–100%) to 1 (100%). The amount may also be stored as an absolute linear value (such as an amount of studs). The rendering engine that renders the avatar with the accessory applied may use this percentage (or linear value, such as studs) to determine where an accessory has been adjusted.

Second, an absolute value of the constraint (or limit) in studs (or any other linear value in the virtual environment) may be stored, (i.e., min=1, max=1.5). This information is included so if a decision is made to change the constraints for any reason, e.g., due to moderation concerns (e.g., change of allowed percentage of constraints (or linear value, such as studs)) the rendering engine is able to interpret existing constraints and where previous adjustments are located on an avatar. Such absolute values are inherent to the operation of the virtual environment and cannot be changed without interfering with the successful operation of the virtual environment.

In some implementations, this information is stored inside an existing metadata field for an asset in an avatar, and in an outfit. Such metadata fields stores certain information about an accessory, but can be extended to store information used when adjusting an accessory. To support this functionality, fields are added to an asset's metadata table when saving an asset, as mentioned above. An example of such supplemented metadata is presented with respect to the markup of FIG. 6. The data sent is a percentage of an allowed adjustment (ranging from –1 to 1, being a percentage (i.e., 0.95 is 95% of the allowed adjustment). While not shown in FIG. 6, it may also be possible to save the data as linear values (such as studs), which may help change limits for accessory adjustments without changing player avatars.

This way, the backend does not have to perform anything specific in regard to data validation. The rendering engine, rather than the backend, is the one to determine what this percentage (or linear value) means. The place where an accessory is to be located may be located by the rendering engine by using the adjustment constraints that are retrieved from avatars according to rules depending on the accessory type.

In some implementations, it may be appropriate to coordinate rendering thumbnails with adjustments made to an accessory. In order for a user's avatar thumbnails to reflect adjustments made, multiple tasks are to be accomplished. First, the backend JavaScript Object Notation (JSON) Binary Large Object (Blob) that is sent to a Thumbnailer is updated to include adjustment information. Given this new JSON Blob, the Thumbnailer then passes this adjustment information to an engine function that sets a character's appearance based on JSON information. There are no script changes involved to accomplish this result. From this point, the rendering engine handles applying the actual adjustments.

The rendering engine is updated for specific Thumbnailer paths. A function to set a character's appearance by modifying associated JSON is updated to apply the adjustment information sent through the JSON format.

Each accessory type may have a refinement limit (constraint) for its allowed position, rotation, and scale adjustments. In some implementations, these constraints may be based on (e.g., proportional to) the size of the body part that the accessory is attached to. For example, a hat on a large head mesh may have a greater positional refinement avatar as compared to a small head mesh. This relationship is used so accessories are able to fit onto more heads more successfully. This relationship also makes it so that accessories of the same size may have the same refinement constraints.

Further details of example implementations of the rigid accessory adjustment are provided in the following pages.

FIG. 1A—Examples of Rigid Accessories Having Poor Fits

FIG. 1A illustrates several examples of rigid accessories having poor fits 100a, in accordance with some implementations. For example, rigid accessories in their original form may not appropriately fit to avatars with different head and/or body sizes and shapes. For example, avatar 102 illustrates an avatar 102 with poorly fitted sunglasses; the sunglasses are too large for the avatar head and do not cover the eyes. Avatar 104 illustrates an avatar 104 with combinations of accessories that do not work well in combination. For example, in avatar 104, a hat should fully cover the skull of the skeleton, but instead the hat protrudes. Avatar 106 illustrates an avatar 106 where there are problems combining hats with underlying hair, e.g., while the hat is a white woolen hat of a type that covers hair consistently, a portion of the hair (above the forehead) are seen through the hat which is an unrealistic appearance of the avatar.

These are only examples, and other situations may occur in which one or more accessories have problems being fit onto avatars. FIG. 1A demonstrates that having only one version of an accessory makes it quite difficult to generalize that accessory for use in different avatars and for use with other accessories.

Figure 1B:
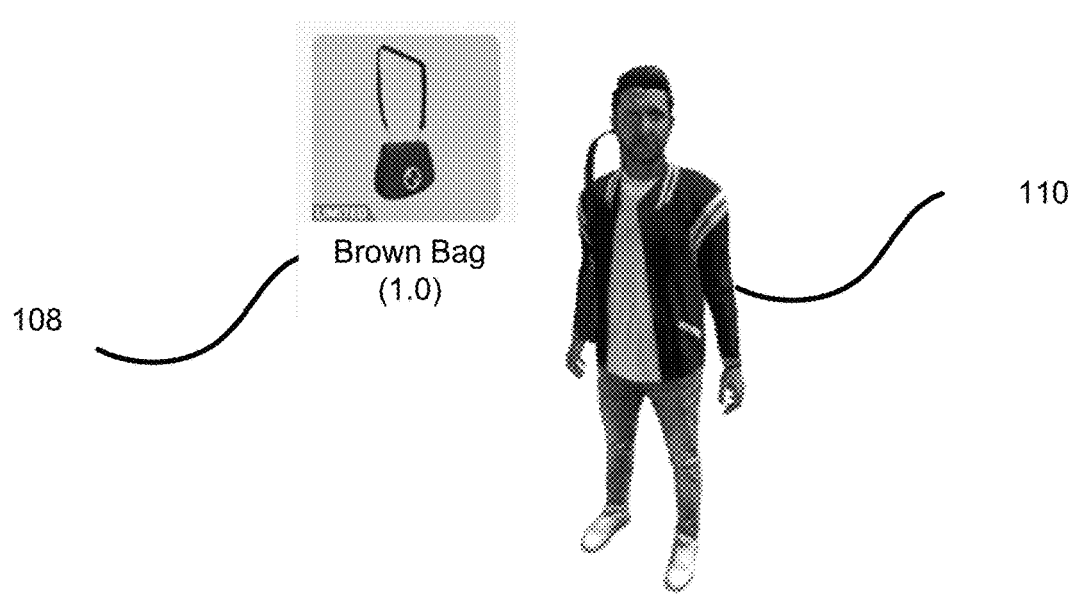
FIG. 1B illustrates examples of duplicate accessories having poor fits, in accordance with some implementations.
Figure 1B:
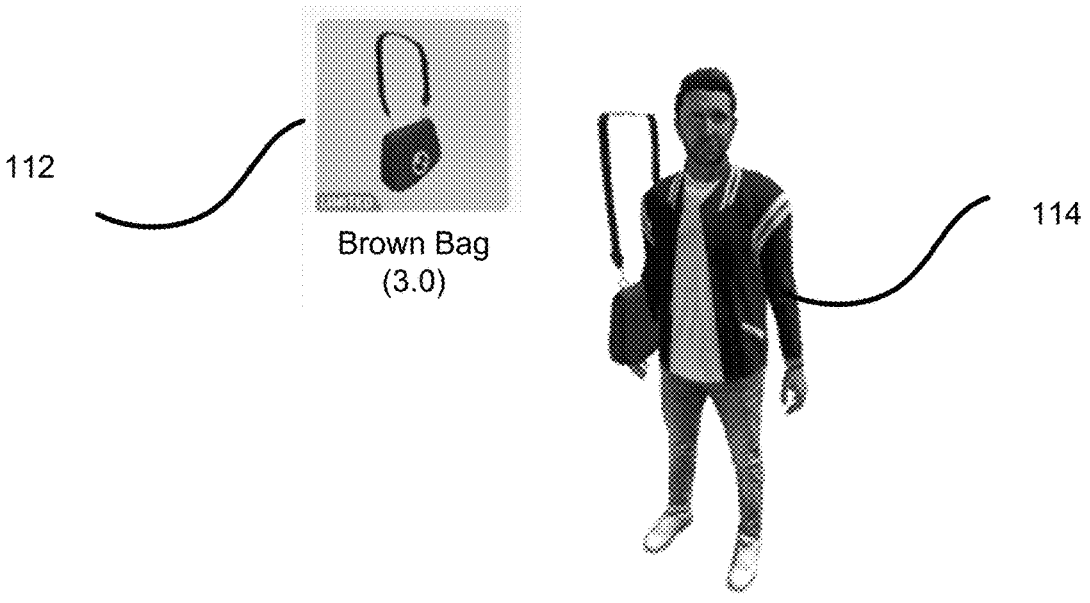

FIG. 1B—Examples of Duplicate Accessories Having Poor Fits

FIG. 1B illustrates examples of accessories having poor fits 100b, in accordance with some implementations. For example, a handbag accessory 108 fits poorly onto avatar 110; the shoulder strap is way above the avatar's shoulder which is unrealistic. There is a second, similar handbag accessory 112 that also fits poorly onto avatar 114; the shoulder strap still floats over the shoulder and the bag is too large. FIG. 1B illustrates that duplicating various versions of an accessory does not confirm that the subsequent various of the accessory fit onto an avatar well.

Figure 1C:
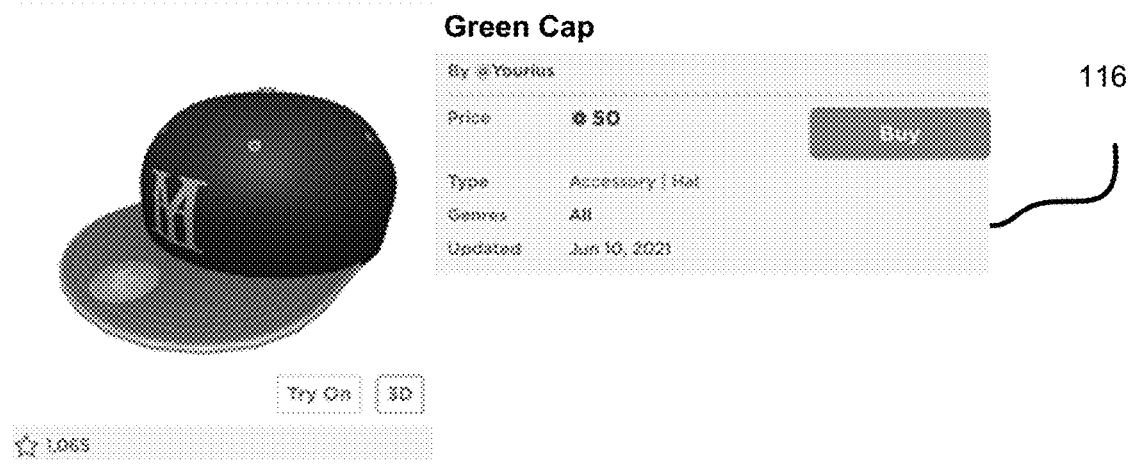
FIG. 1C illustrates examples of duplicate accessories to accommodate different stylistic choices, in accordance with some implementations.
Figure 1C:
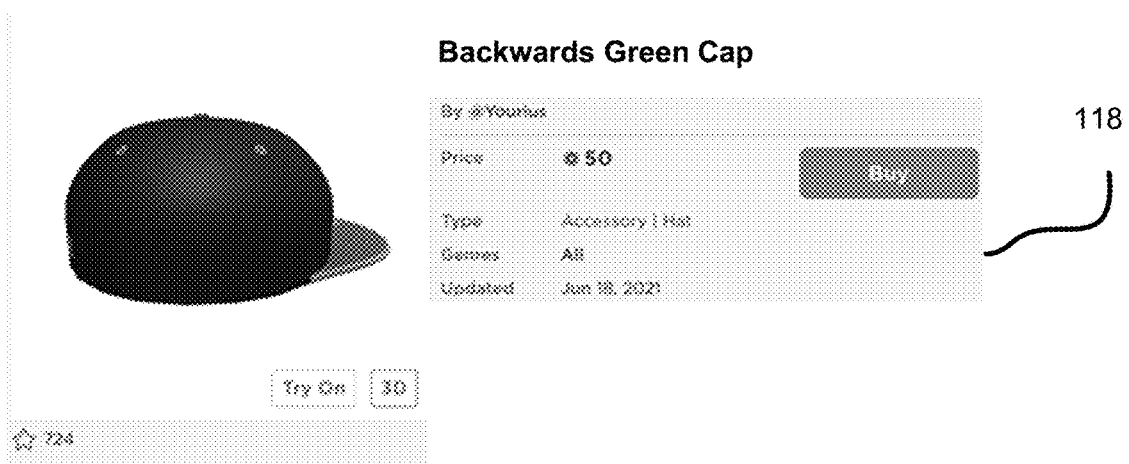

FIG. 1C—Examples of Duplicate Accessories with Different Stylistic Choices

FIG. 1C illustrates examples of duplicate accessories to accommodate different stylistic choices 100c, in accordance with some implementations. For example, baseball cap 116 is front-facing and baseball cap 118 is backwards-facing. FIG. 1C illustrates that to provide an accessory that can be worn by an avatar in different ways, e.g., different orientations, or other small modifications (repositioning, rotating, scaling, etc.), multiple duplicate copies need to be provided since an accessory may often have an incorrect appearance when worn by the avatar, as illustrated in FIG. 1A and FIG. 1B. Creators need to therefore create multiple versions for different modifications so that the accessory can fit different avatar heads and bodies, and with various modifications to position, orientation, scale, etc.

This is cumbersome. Providing and storing multiple versions of the same accessory is much less flexible than it is to have one master version of the accessory and perform adjustments (e.g., position adjustments, rotation adjustments, scale adjustments). These changes are relatively small, so it is easier to automatically make the edits and to let users and developers make these changes rather than storing multiple variants and requiring users to search for a variant that fits their particular avatar.

Figure 2:
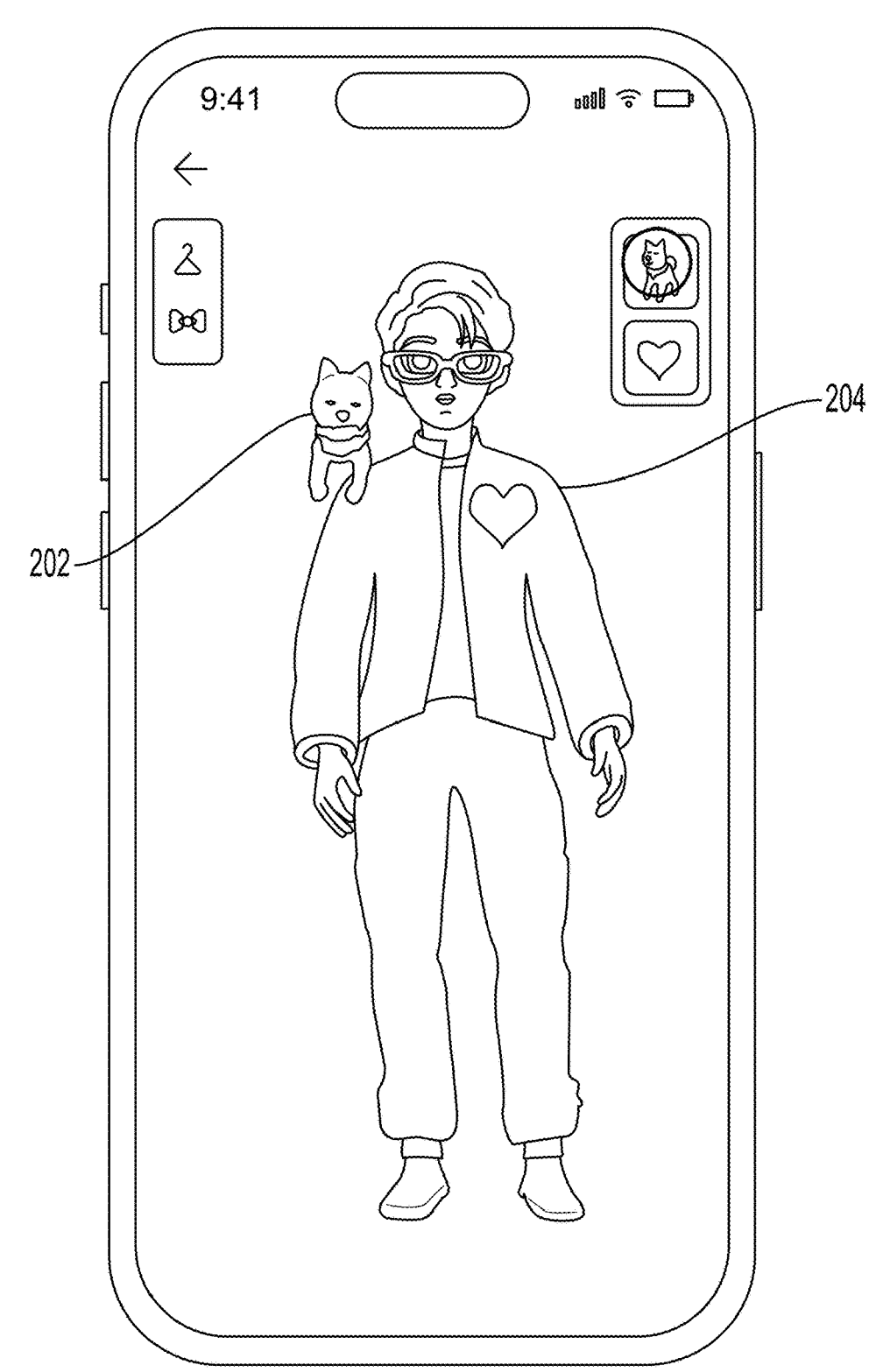
FIG. 2 illustrates a screenshot of an example interface for accessory refinement, in accordance with some implementations.

FIG. 2—Interface for Accessory Refinement

FIG. 2 illustrates a screenshot of an example interface for accessory refinement 200, in accordance with some implementations. For example, FIG. 2 illustrates a pet dog accessory 202 perched on the right shoulder of an avatar 204. FIG. 2 illustrates the pet dog accessory 202 and the avatar 204 in an unadjusted form. The pet dog accessory 202 may be positioned, rotated, and scaled to match the avatar 204 well.

It may be helpful to modify the pet dog accessory 202 without detrimentally affecting the fit of the pet dog accessory 202 to the avatar 204. FIGS. 3A-3B, 4A-4B, and 5A-5B illustrate a sequence of adjustments made to the pet dog accessory 202. Such adjustments may be performed using sliders and/or gimbals as discussed herein. As discussed, sliders provide a bar that allows a user to choose a value from a range. Gimbals are mechanisms that help facilitate changing the orientation of an object. Gimbals may frame an accessory and help provide guidance to users about how to manipulate the accessory.

For example, adjustments may occur for an avatar in the context of an editor program. Such an editor program may be a part of a studio platform that allows users to create games and virtual experiences in a virtual environment. The editor program may provide three-dimensional building tools that allows users to create and modify avatars, as well as corresponding environments and landscapes and scripts. The editor program may also allow users to create and modify accessories, as well as to associate the accessories with the avatars and adjust the accessories as discussed herein. In an editor program, when the player selects save, the adjustments are recorded and are immediately visible to other players.

As another example, adjustments may occur for an avatar in the context of a store program. Such a store program is a marketplace by and through which creators may publish, sell, and obtain assets (including models, decals, audio, video, meshes, and plugins) for use in the virtual environment. In particular, in some implementations, the store program may be used by a user to select an accessory, where the accessory may be adjusted (with respect to position, rotation, and/or scale) prior to purchase.

In a store program, if a player adjusts and purchases an asset while checking "Wear Item After Purchase," the newly purchased asset incorporates the adjustments made in the store program as part of the shopping interaction (e.g., accessory purchase). If a user does not select this option, the adjustments are lost and the accessory reverts to its last saved adjustments (which may be its original or default adjustments). In some implementations, "Wear Item After Purchase," may default to being selected (in which case the avatar is automatically depicted in a virtual experience wearing the purchased accessory), whereas in other implementations "Wear Item After Purchase," may default to not being selected (in which case the avatar is not depicted in a virtual experience wearing the purchased accessory until a player associated with the avatar explicitly indicates so).

There may also be aspects of what happens to a player's saved adjustments if the player unequips and re-equips the accessory. In an editor program, if the player is within the same session (i.e., the player has not closed and/or left the editor program), the accessory adjustments may persist. This makes it harder for the players to become frustrated and/or irritated by accidentally losing adjustments. Even if adjustments persist in this manner, players can use a reset button to set the adjustments back to default values.

In some implementations, undo and redo buttons may be provided to enable a user to reverse and redo adjustments once at a time. A cache of accessory adjustments made by a user may be maintained to support these buttons. The cache may be specific to the user session in the editor program. If a player leaves an editor program with equipped, adjusted accessories, the adjustments persist. If a player unequips, leaves the editor program, then comes back and re-equips, the adjustments are reset to the defaults for the accessory.

In a store program, if a player pulls up a try-on manager interface and selects or deselects an accessory without closing the drawer (of accessories to try on in the try-on manager interface), the adjustments persist. Adjustments persist until a player unequips an accessory and closes the drawer for try-ons.

In some implementations, a web-based editor for accessory adjustment may be provided. In some implementations, the web-based editor may support users viewing their avatar equipped with accessories, but not support making edits. Players can reset adjustments by un-equipping and re-equipping accessories. In some implementations, editing functionality may be provided. Such editing functionality may include sliders and/or gimbals as discussed with respect to the editor program and/or the store program.

In some implementations, a web-based editor may provide text fields where a user can enter numbers to modify the adjustments. For example, a user may enter +20 x-position, −5 degrees y-rotation, and scale +1.2 x (uniform). Such information could correspond to a percentage or to a linear value, as discussed herein. This text interface allows players on the internet (that are not using client software such as a mobile or desktop application, but rather using a browser) to adjust accessories. The text may be entered in various ways, such as by a keyboard, a virtual keyboard on a touch screen, or by speech recognition. A web-based editor may also be provided that provides sliders and gimbals, as discussed above. The players can also be prompted to use an editor program for a better adjustment experience.

Figure 3A:
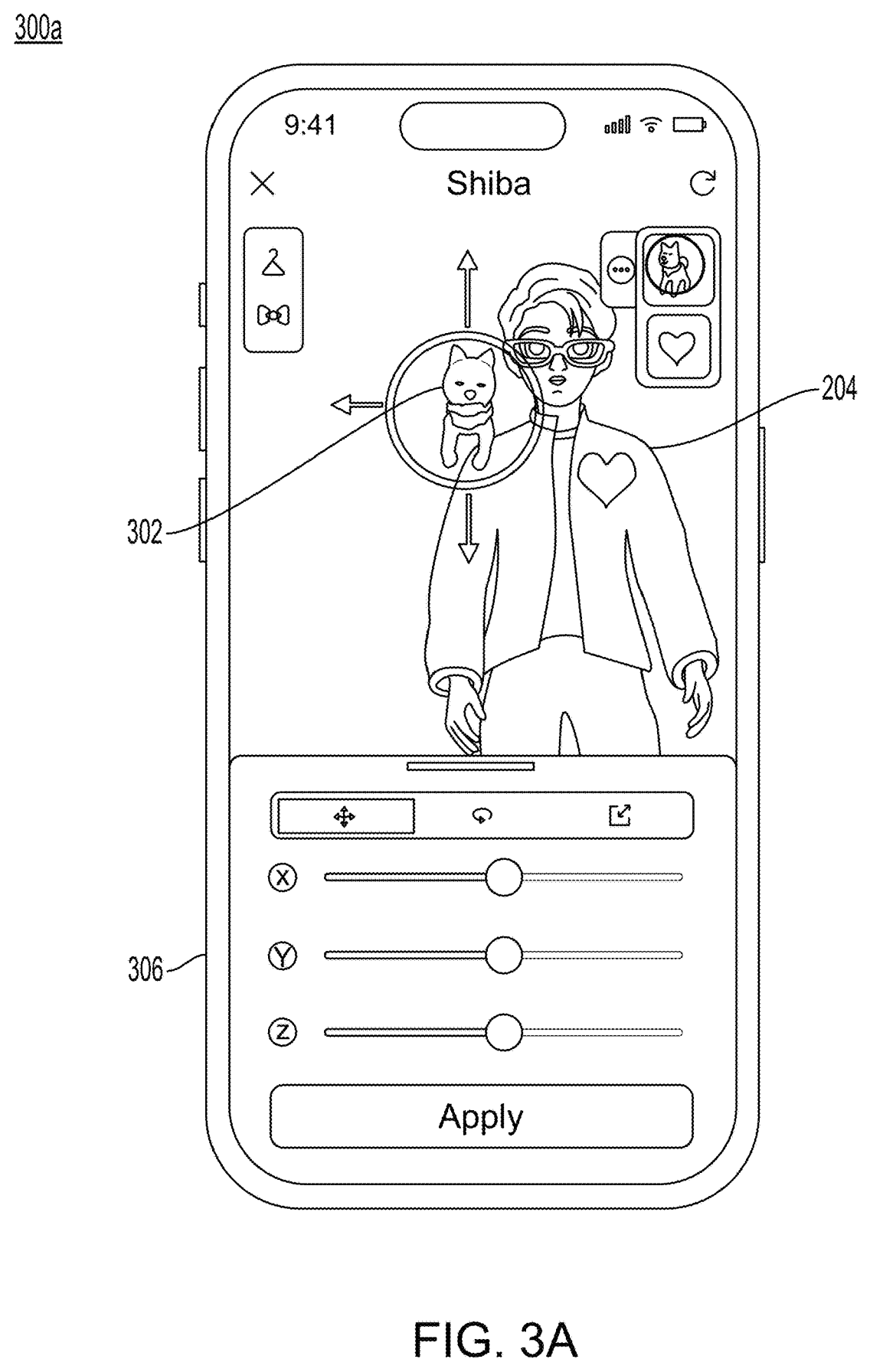

FIG. 3A—Interface for Modifying Position (Pre-Adjustment)

FIG. 3A illustrates a screenshot of an example interface for accessory refinement with respect to position prior to adjustment 300a, in accordance with some implementations. For example, FIG. 3A illustrates pet dog accessory with position handles 302. The pet dog accessory with position handles 302 may be repositioned using controls 306. For example, controls 306 illustrates sliders that allow for repositioning pet dog accessory with position handles 302 along the X axis, along the Y axis, and/or along the Z axis.

The user interface may indicate to a user what direction/axis the sliders are affecting. The UI is draggable. For example, when adjusting position, a user may drag a slider from controls 306 and pet dog accessory with position handles 302 updates its position accordingly. As another example, when adjusting position, a user may drag pet dog accessory with position handles 302 and slider(s) from controls 306 update accordingly. In some implementations, players may use sliders and/or gimbals to adjust the position, rotation, and/or scale of an accessory. Any movement in the 3D space using the gimbals is also reflected on the slider bar(s).

Figure 3B:
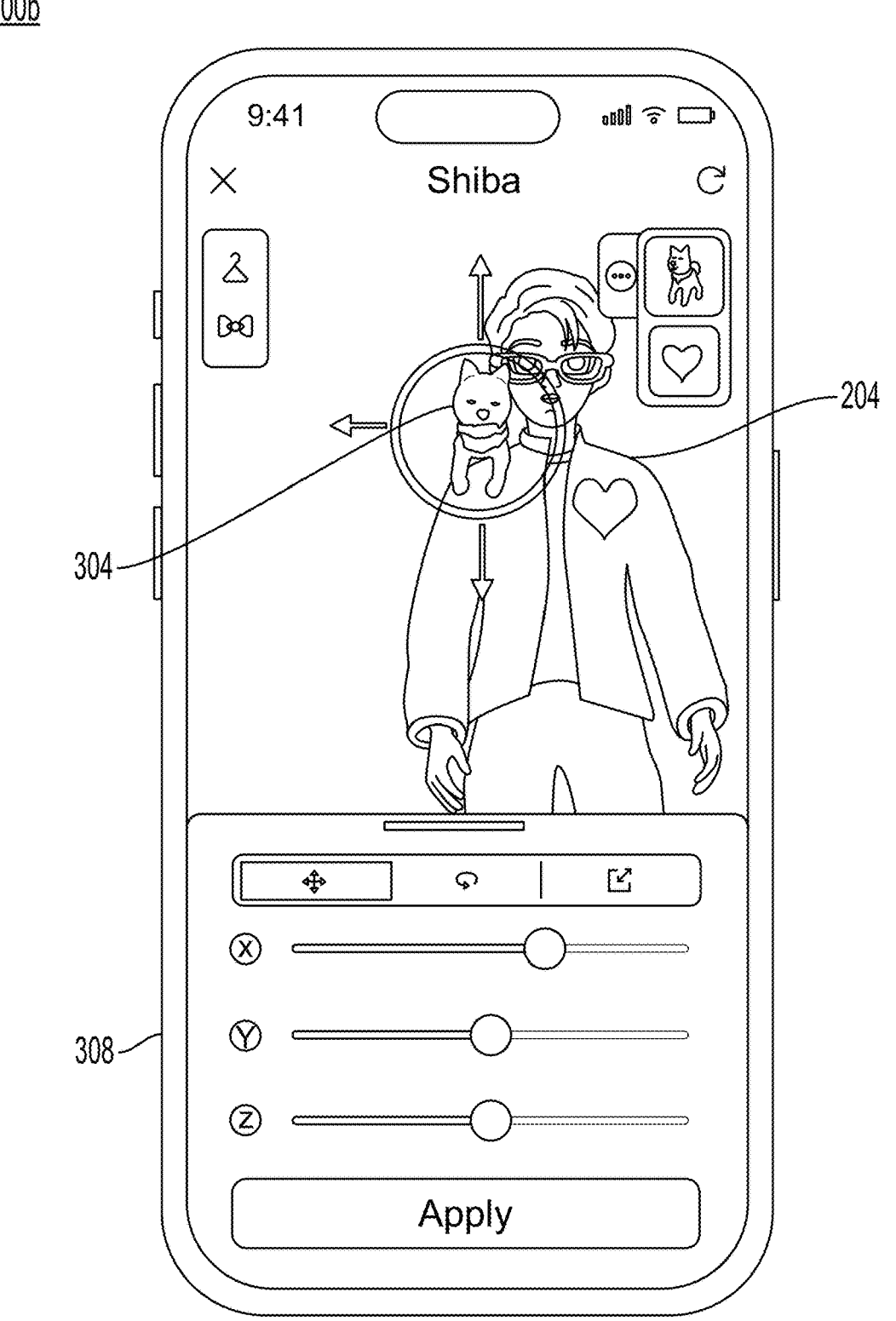
FIG. 3B illustrates a screenshot of an example interface for accessory refinement with respect to position after adjustment, in accordance with some implementations.

FIG. 3B—Interface for Modifying Position (Post-Adjustment)

FIG. 3B illustrates a screenshot of an example interface for accessory refinement with respect to position after adjustment 300b, in accordance with some implementations. For example, FIG. 3B illustrates pet dog accessory with position handles 304. The pet dog accessory with position handles 304 has been repositioned (relative to FIG. 3A)

using controls 308. For example, controls 308 illustrates sliders that allow for repositioning pet dog accessory with position handles 302 along the X axis, along the Y axis, and/or along the Z axis. Controls 308 illustrate that the X axis control was moved to the right. Accordingly, pet dog accessory with position handles 304 is moved to the right of the screen (closer to the neck of avatar 204) and is now more proximate to avatar 204 than that in FIG. 3A.

Figure 4A:
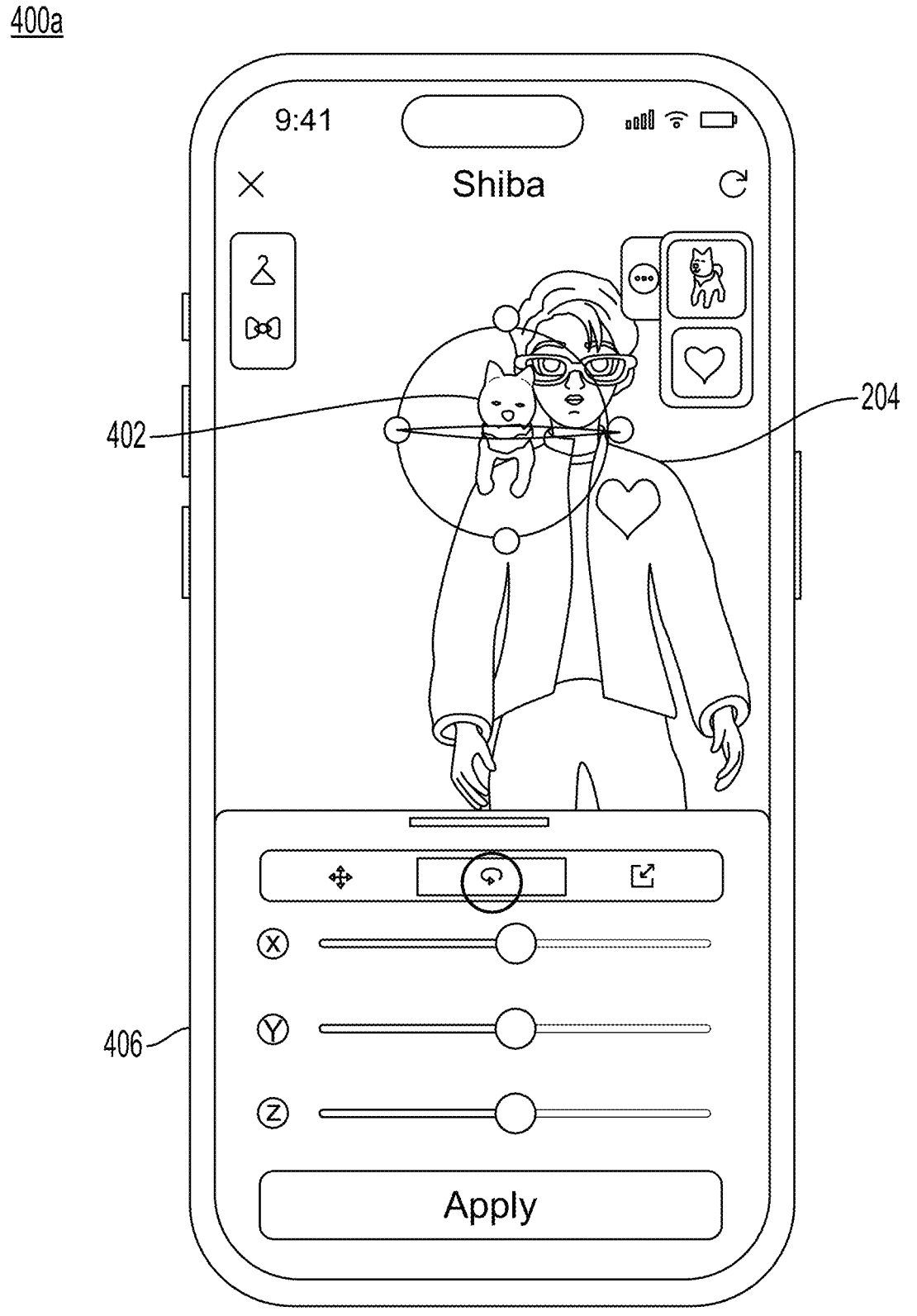
FIG. 4A illustrates a screenshot of an example interface for accessory refinement with respect to rotation prior to adjustment, in accordance with some implementations.

FIG. 4A—Interface for Modifying Rotation (Pre-Adjustment)

FIG. 4A illustrates a screenshot of an example interface for accessory refinement with respect to rotation prior to adjustment 400*a*, in accordance with some implementations. For example, FIG. 4A illustrates pet dog accessory with rotation handles 402. Pet dog accessory with rotation handles 402 includes the repositioning that occurs in FIGS. 3A-3B. That is, pet dog accessory with rotation handles 402 is closer to avatar 204 than pet dog accessory with rotation handles 402 originally was. The pet dog pet dog accessory with rotation handles 402 may be further adjusted using controls 406. For example, controls 406 illustrates sliders that allow for rotating pet dog accessory with rotation handles 402 along the X axis, along the Y axis, and/or along the Z axis.

As discussed, the UI is draggable (one of the sliders, gimbals, and/or object may be manipulated and other corresponding UI elements may change accordingly simultaneously).

Figure 4B:
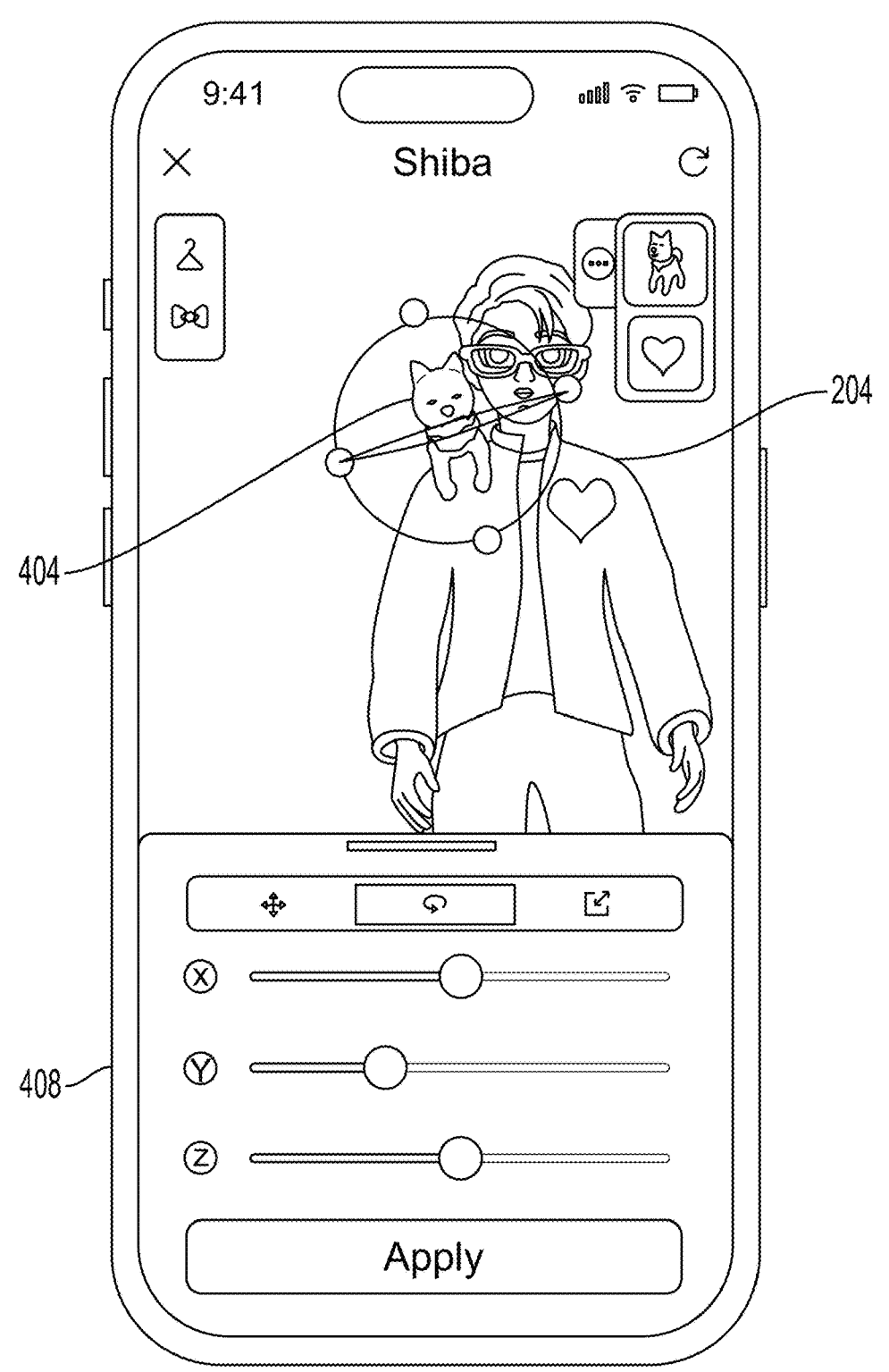
FIG. 4B illustrates a screenshot of an example interface for accessory refinement with respect to rotation after adjustment, in accordance with some implementations.

FIG. 4B—Interface for Modifying Rotation (Post-Adjustment)

FIG. 4B illustrates a screenshot of an example interface for accessory refinement with respect to rotation after adjustment 400*b*, in accordance with some implementations. For example, FIG. 4B illustrates pet dog accessory with rotation handles 404. The pet dog accessory with rotation handles 404 has been rotated using controls 408. For example, controls 408 illustrate sliders that allow for rotating pet dog accessory with rotation handles 404 along the X axis, along the Y axis, and/or along the Z axis. Controls 408 illustrate that the Y axis control was moved to the left. Accordingly, pet dog accessory with rotation handles 404 is rotated and the head of pet dog accessory with rotation handles 404 is now further from avatar 204, while its paws are closer to avatar 204.

Figure 5A:
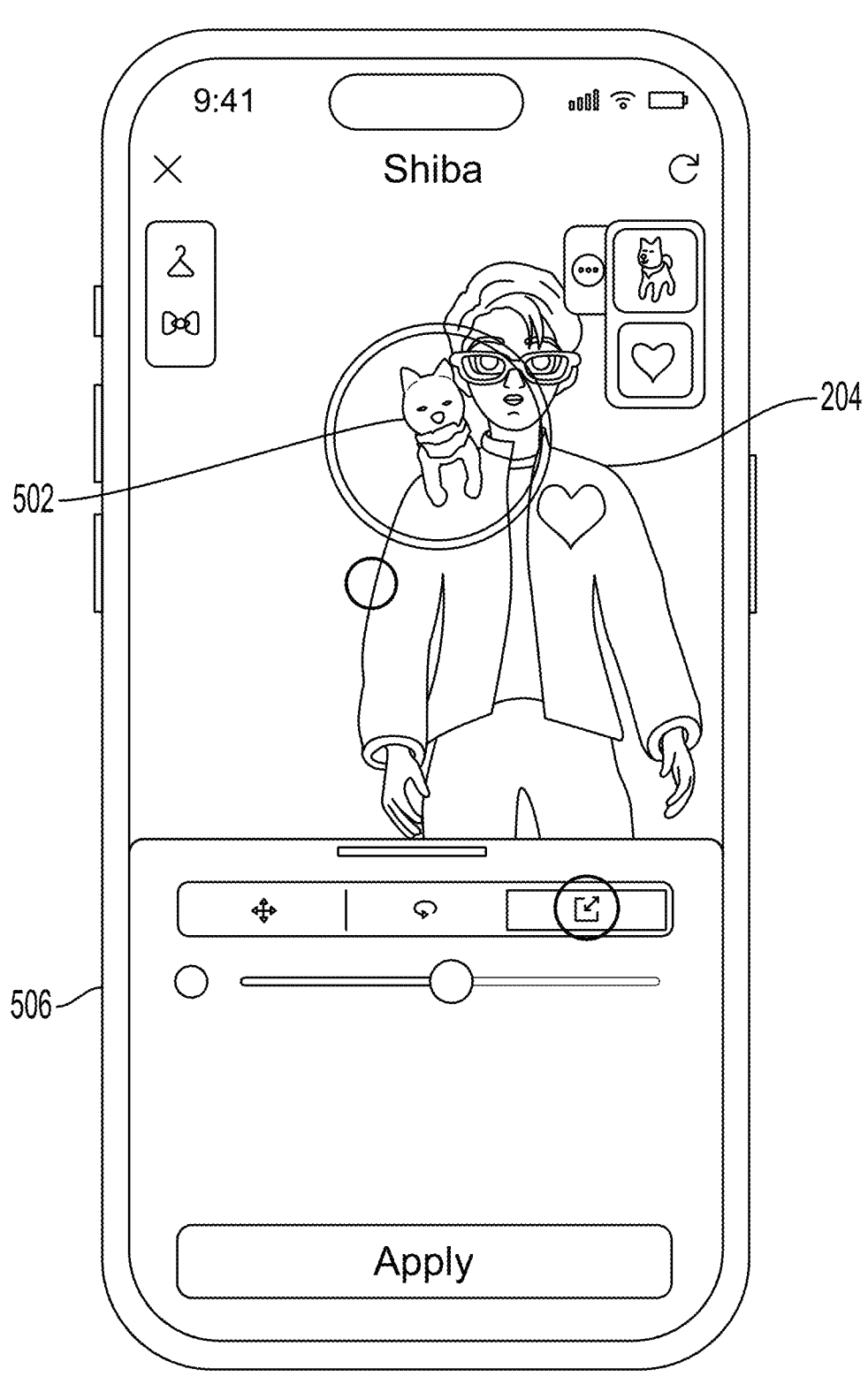
FIG. 5A illustrates a screenshot of an example interface for accessory refinement with respect to scale prior to adjustment, in accordance with some implementations.

FIG. 5A—Interface for Modifying Scale (Pre-Adjustment)

FIG. 5A illustrates a screenshot of an example interface for accessory refinement with respect to scale prior to adjustment 500*a*, in accordance with some implementations. For example, FIG. 5A illustrates pet dog accessory with a scale handle 502. Pet dog accessory with a scale handle 502 includes the repositioning that occurs in FIGS. 3A-3B and the rotation that occurs in FIGS. 4A-4B. The pet dog accessory with a scale handle 502 may be resized using control 506. For example, control 506 illustrates a slider that allow for resizing pet dog accessory with scale handle 502 uniformly along the X axis, along the Y axis, and/or along the Z axis. FIG. 5A illustrates an implementation in which scaling occurs uniformly along all of the axes. Scaling can also mean changing a size of a given object. In some implementations, it may be possible to provide scaling that occurs on an axis-by-axis basis, with different degree of scaling on different axes.

As discussed, the UI is draggable (a slider and/or scale handle may be manipulated and other UI elements may change accordingly simultaneously).

Figure 5B:
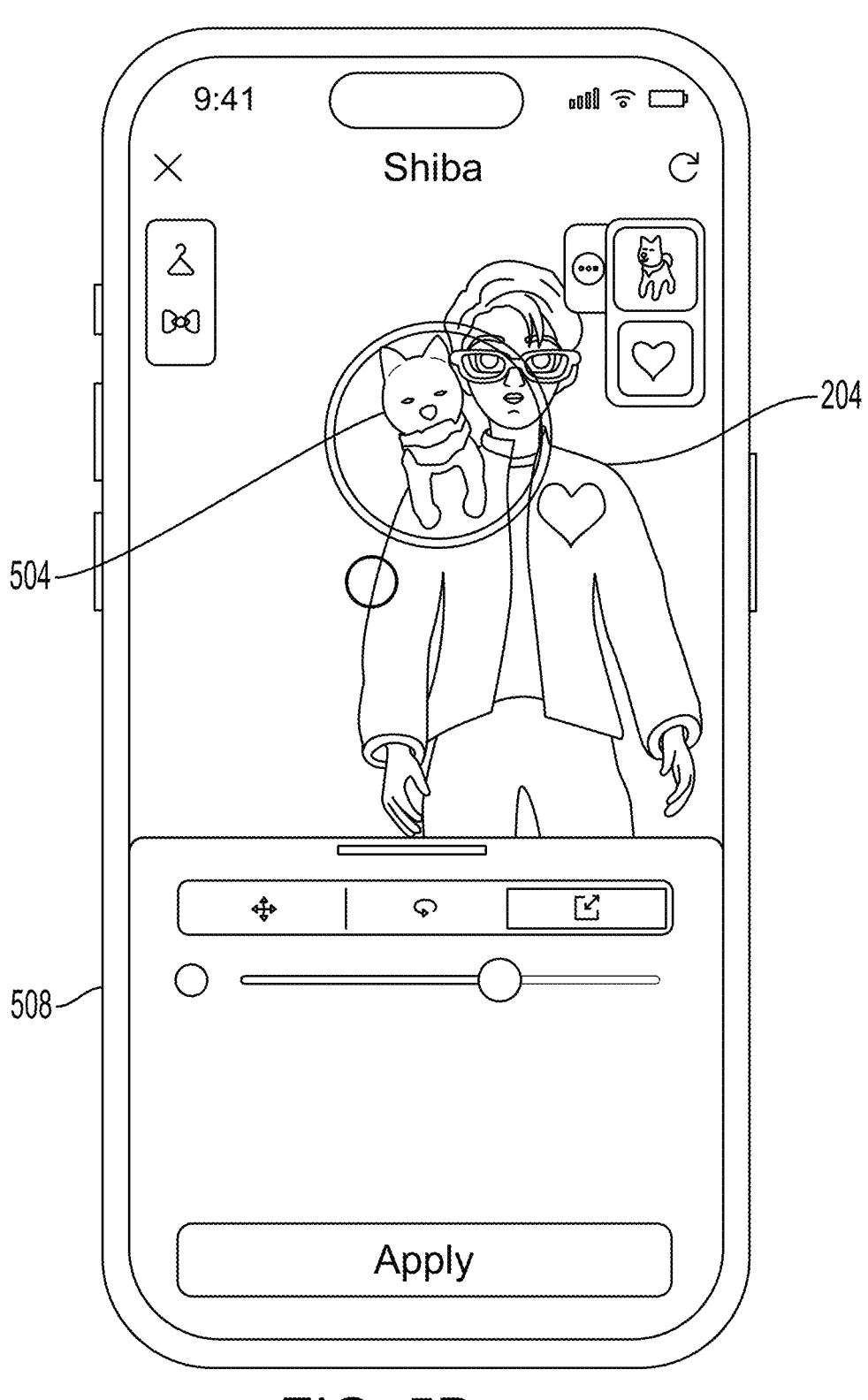
FIG. 5B illustrates a screenshot of an example interface for accessory refinement with respect to scale after adjustment, in accordance with some implementations.

FIG. 5B—Interface for Modifying Scale (Post-Adjustment)

FIG. 5B illustrates a screenshot of an example interface for accessory refinement with respect to position after adjustment 500*b*, in accordance with some implementations. For example, FIG. 5B illustrates pet dog accessory with a scale handle 504. The pet dog accessory with a scale handle 504 has been scaled using control 508. For example, control 508 illustrates a slider that provides for scaling pet dog accessory with a scale handle 504 along the X axis, along the Y axis, and/or along the Z axis (with a uniform scaling). Control 508 illustrates that the scale slider was moved to the right of the screenshot. Accordingly, pet dog accessory with a scale handle 504 is larger in size compared to FIG. 5A.

FIGS. 5A-5B illustrate a scale adjustment in which a uniform scale is provided. However, non-uniform scale, such as axis-by-axis scaling, can also be supported in various implementations.

Figure 6:
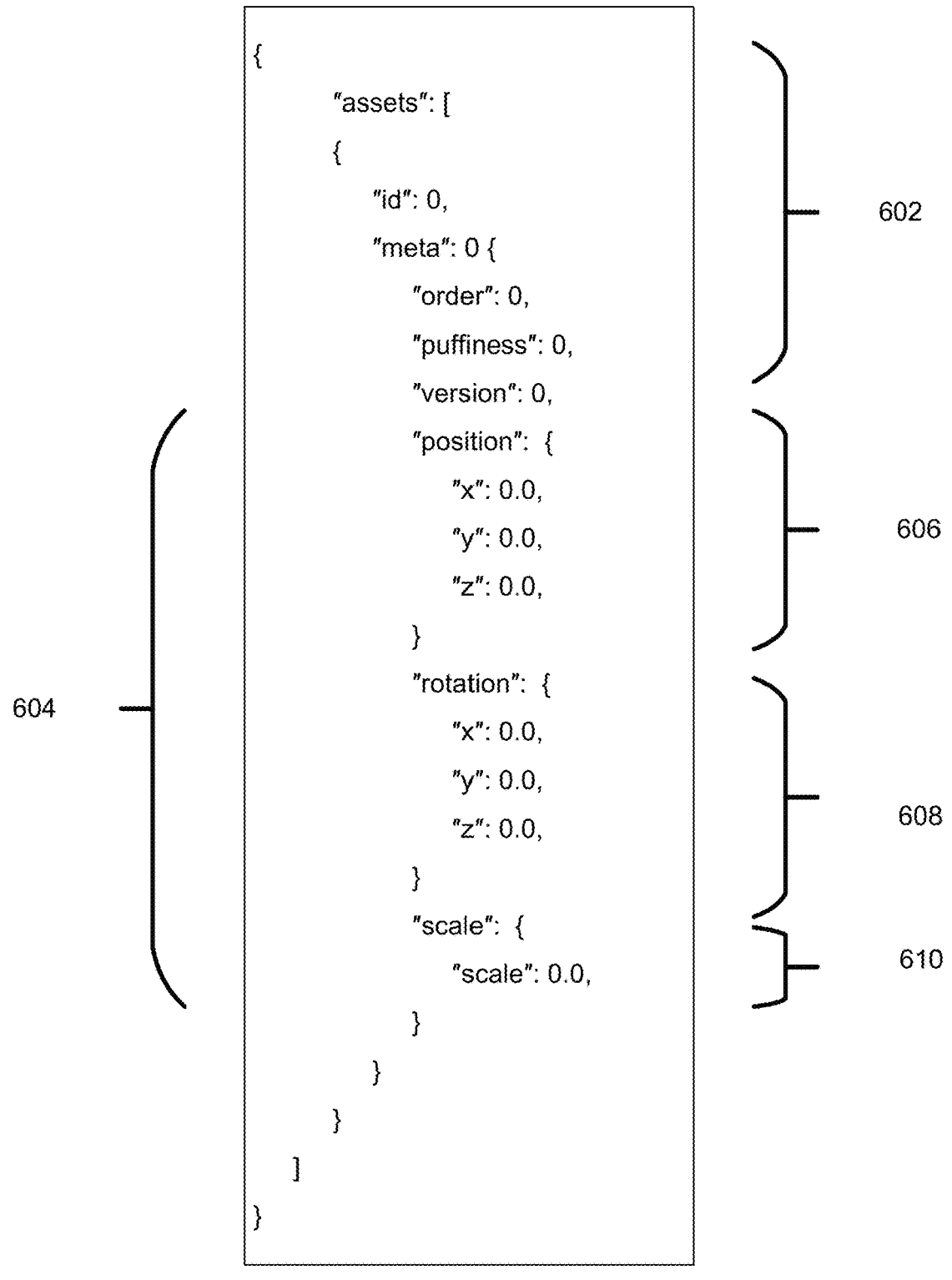
FIG. 6 illustrates markup language including information about accessories, including adjustment information, in accordance with some implementations.

FIG. 6—Markup Language

FIG. 6 illustrates markup language 600 including information about accessories, including adjustment information, in accordance with some implementations. For example, the markup illustrated in FIG. 6 is in JavaScript Object Notation (JSON). However, other markup languages may be used in other implementations. For example, such markup language may include key-value pair information that defines a structure for adjustment information, so that the adjustment information may be stored in association with assets for use in rendering by the rendering engine. Such metadata may be stored as metadata in a field associated with the rigid accessory in the 3D environment. The association may be based on an identifier, such as an Asset ID.

The first part of the markup 602 provides the type of item being defined and parameters other than those provided by the adjustment. For example, the first part of the markup 602 identifies a block "assets" indicating that the JSON corresponds to an asset (which may be an accessory). For example, an accessory may be a particular type of asset fitted to an avatar. Some types of accessories may include accessory types such as hat/head, neck, shoulder, face, front, back and waist. There is also a key-value pair "id" indicating the identifier of the accessory, and a key-value pair "meta" including the metadata for the accessory. Some of the metadata was previously stored with the accessory, including key-value pairs for "order," "puffiness," and "version," which may be used by the virtual environment to manage and/or render the accessory. However, implementations also include new additions to the metadata.

The new data is a markup part 604 of the markup language 600. The markup part 604 may include three subparts, specifically position part 606, rotation part 608, and scale part 610. Position part 606 stores key-value pairs for x-axis repositioning, y-axis repositioning, and z-axis repositioning. Rotation part 608 stores key-value pairs for x-axis rotation, y-axis rotation, and z-axis rotation. Scale part 610 stores a key-value pair for overall scaling. In some implementations, scale part 610 may be modified to provide non-uniform scaling.

Each adjustment of the position, the rotation, and the scale may be stored as the metadata as a percentage of a corresponding allowed adjustment constraint, or may be stored as a linear value, such as studs. In some implementations, the metadata may also include information about absolute values of limits of a corresponding adjustment constraint according to a distance measure in the 3D environment. However, these absolute values of limits may also be stored and retrieved separately based on accessory type.

Markup language 600 is not illustrated as including information about adjustment thresholds. In some implementations, it may be possible to integrate such information into the markup language 600.

Figure 7:
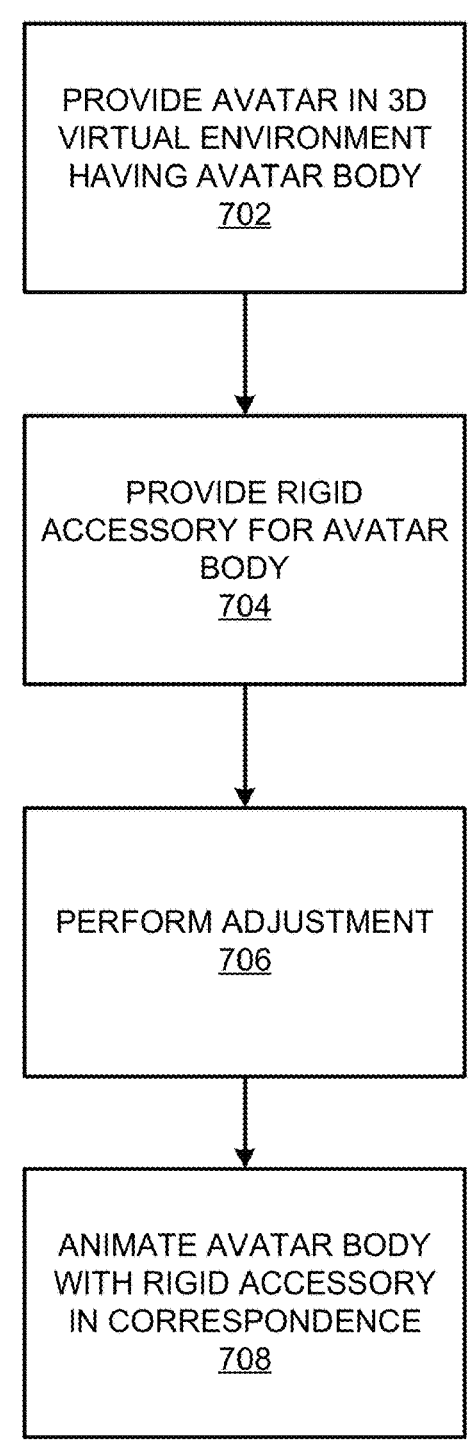
FIG. 7 illustrates a flowchart of an example computer-implemented method to adjust a rigid accessory and animate the rigid accessory in correspondence with an avatar body, in accordance with some implementations.

FIG. 7—Adjusting and Animating Rigid Accessory

FIG. 7 illustrates a flowchart of an example computer-implemented method 700 to adjust a rigid accessory and animate the rigid accessory in correspondence with an avatar body, in accordance with some implementations. Method 700 may begin at block 702.

At block 702, an avatar is provided in a three-dimensional virtual environment, the avatar having an avatar body. Such an avatar may be an avatar associated with a user. The avatar may be an avatar where the user plans to associate at least one accessory with that avatar. The user may provide user input to make adjustments to the accessory. Block 702 may be followed by block 704.

At block 704, a rigid accessory is provided for the avatar body. Such a rigid accessory may be a rigid accessory that the user commands to be associated with the avatar body of the avatar. For example, the rigid accessory may be chosen in an appropriate selection environment, such as a virtual store program or a virtual editor program. Block 704 may be followed by block 706.

Figure 8:
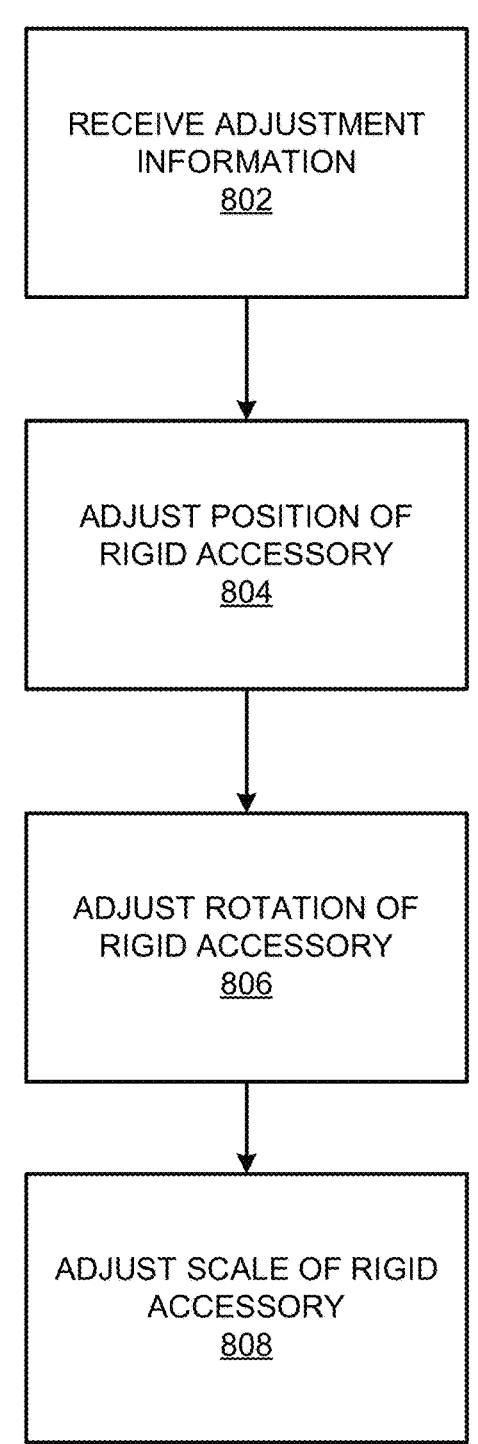
FIG. 8 illustrates a flowchart of an example computer-implemented method to make adjustments to a rigid accessory, in accordance with some implementations.

At block 706, an adjustment is performed on the rigid accessory. Such adjustment may be performed automatically, based on user input, or based on a combination of these. Such an adjustment may include a position adjustment (such as along the x-axis, the y-axis, and/or the z-axis), a rotation adjustment (such as along the x-axis, the y-axis, and/or the z-axis), and a scale adjustment (such as uniformly, or along the x-axis, the y-axis, and/or the z-axis). For example, the adjustment may be made in a virtual store program or a virtual editor program by using an appropriate user interface. Block 706 may be followed by block 708. Such adjustment information may be stored as metadata in association with the accessory and as metadata in association with the avatar. FIG. 8 provides additional information about how such adjustment information is obtained and used.

At block 708, the avatar body is animated with the rigid accessory in correspondence. To permit this, a rendering engine may use the metadata that includes the adjustments made to accessories. Thus, the rendering engine may ascertain which accessories are associated with a given avatar. When rendering the avatar, the rendering engine may also automatically retrieve metadata associated with the avatar and metadata associated with the accessories. Such metadata may provide the rendering engine with the information that permits the rendering engine to render the accessory or accessories properly as a virtual experience in a virtual environment proceeds.

As an alternative to block 708, in which the avatar body is animated with the rigid accessory, it may be possible to render an image of the avatar with the adjusted accessories, such as in an editor program, a store program, or a web editor program.

FIG. 8—Making Adjustments to Rigid Accessory

FIG. 8 illustrates a flowchart of an example computer-implemented method 800 to make adjustments to a rigid accessory, in accordance with some implementations. Method 800 may begin at block 802.

At block 802, adjustment information may be received from a user. The adjustment information may include position adjustment information, rotation adjustment information, and scaling adjustment information. For example, the adjustment information may be received in the context of an editor program, a store program, or a web editor program. For example, the adjustment information may include, for position adjustment, slider manipulation information, gimbal manipulation information, and/or text information corresponding to accessory manipulation along the x-axis, the y-axis, and/or the z-axis.

Further, the adjustment information may include, for rotation adjustment, slider manipulation information, gimbal manipulation information, and/or text information corresponding to accessory manipulation along the x-axis, the y-axis, and/or the z-axis. Finally, the adjustment information may include, for scale adjustment, slider manipulation information, gimbal manipulation information, and/or text information corresponding to uniform accessory manipulation for scaling, or independent scaling along the x-axis, the y-axis, and/or the z-axis.

Block 802 may be followed by block 804. At block 804, the position of the rigid accessory is adjusted. Such an adjustment may be made on the basis of the adjustment information received from the user. As noted, the adjustments may include manual adjustment information, but all or some of the adjustment information may be generated automatically to help in the adjustment. For example, the accessory may be repositioned along one or more of the x-axis, the y-axis, and/or the z-axis, relative to the origin and/or axes of the accessory. There may be constraints as to how far a given accessory can be repositioned in a given direction. The adjustment may be defined by a percentage value ranging from −1.0 to 1.0 (−100% to 100%), where each adjustment determines how far the rigid accessory is translated from the origin along each axis. Alternatively, the adjustment may be defined by a linear value (such as a number of studs) to define the adjustment. Block 804 may be followed by block 806.

At block 806, the rotation of the rigid accessory is adjusted. Such an adjustment may be made on the basis of the adjustment information received from the user. As noted, the adjustments may include manual adjustment information, but all or some of the adjustment information may be generated automatically to help in the adjustment. For example, there may be a rotation along the x-axis, the y-axis, and/or the z-axis. There may be constraints as to how far a given accessory is able to rotate in a given direction. The adjustment may be defined by a percentage value ranging from −1.0 to 1.0 (−100% to 100%), where each adjustment determines how far the rigid accessory is rotated from the original orientation along each axis. Alternatively, the adjustment may be defined by a linear value (such as a number of studs) to define the adjustment. Block 806 may be followed by block 808.

At block 808, the scale of the rigid accessory is adjusted. Such an adjustment may be made on the basis of the adjustment information received from the user. As noted, the adjustments may include manual adjustment information, but all or some of the adjustment information may be generated automatically to help in the adjustment. For example, there may be an overall scaling. There may be constraints as to how far a given accessory is able to scale (increase or decrease in size) in a given direction. The adjustment may be defined by a percentage value ranging from −1.0 to 1.0 (−100% to 100%), where each adjustment determines how far the rigid accessory is scaled from its original size. Alternatively, the adjustment may be defined by a linear value (such as a number of studs) to define the adjustment. The percentage value (or linear value) may specify where in a range of scale factors the adjustment is selected by the user to be. Alternatively, the adjustment may be stored based on actual linear values based on defined linear values (such as studs). After block 808, the rigid accessory has been adjusted for position, rotation, and/or scale and the rigid accessory is ready to integrate with the avatar.

The adjustments performed in block 804 to position, in block 806 to rotation, and in block 808 to scale are independent of one another. For example, rotations are performed with respect to the center of the accessory. This is decoupled from the position of the asset. Changing rotation does not change the position slider of the asset, and vice versa. Likewise, the accessory may be scaled without affecting the position and/or rotation of the asset.

Figure 9:
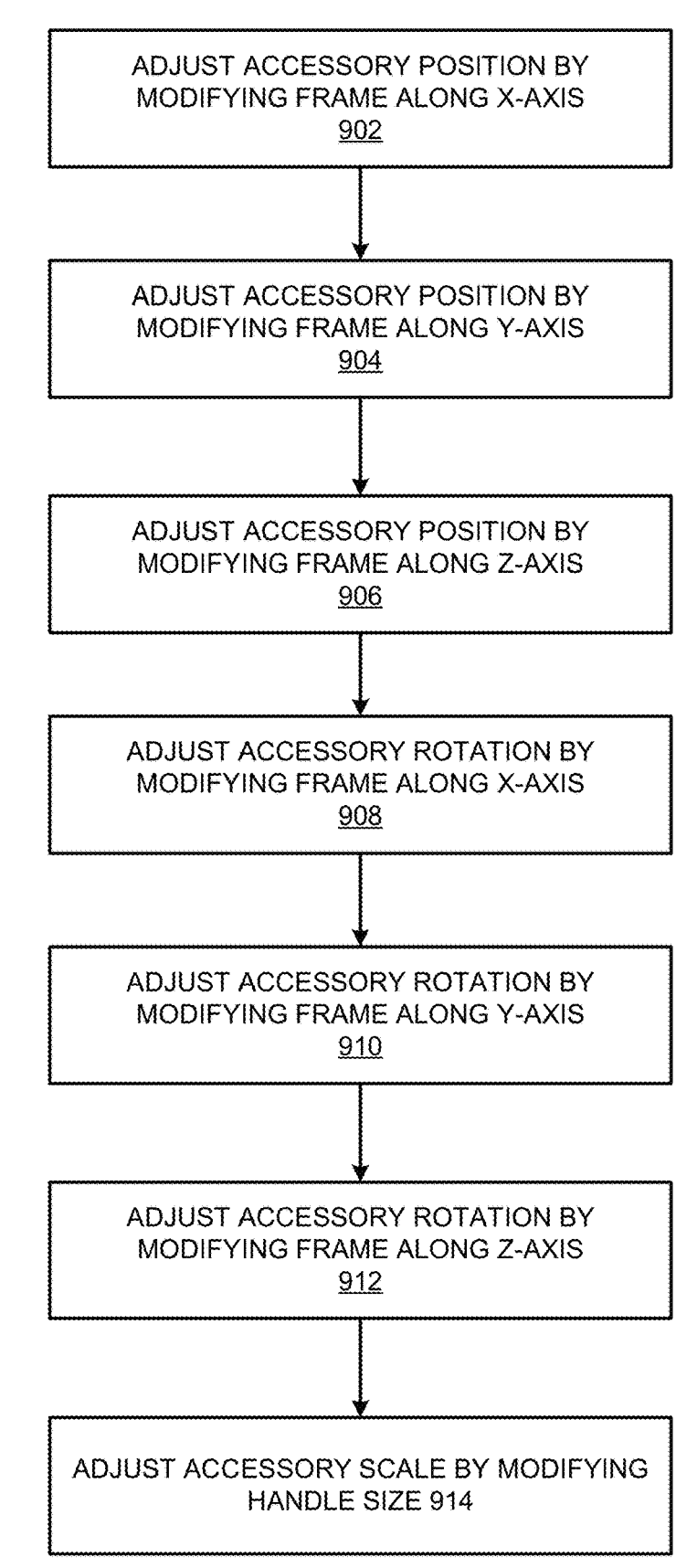
FIG. 9 illustrates a flowchart of an example computer-implemented method to make detailed adjustments to a rigid accessory, in accordance with some implementations.

FIG. 9—Making Detailed Adjustments to Rigid Accessory

FIG. 9 illustrates a flowchart of an example computer-implemented method 900 to make detailed adjustments to a rigid accessory, in accordance with some implementations. Method 900 may begin at block 902. While FIG. 9 illustrates a set of steps for adjusting the accessory position, rotation, and/or scale, implementations are not limited. The steps can be performed in any order.

At block 902, a specific detail of the accessory position is adjusted by modifying a frame along the x-axis. Such a frame may be a bounding box (such as a rectangular prism) that helps manage spatial characteristics of the accessory. Such a frame may also help allow a user to manipulate the accessory itself rather than a slider. Such modifications may be made using a slider, a gimbal, or by entering text-based modifications. There may be a maximum change in the negative x-axis direction and a maximum change in the positive x-axis direction. The change may be stored as a signed percentage value of the allowable change, where the sign of the percentage indicates a direction. The change may also be stored as a linear value (such as in studs). The change may be applied proportionally to the x-axis position constraints. There may also be a check for policy violating adjustments prior to or immediately after implementation (e.g., reports of violative behavior and/or using a moderation pipeline). Block 902 may be followed by block 904.

At block 904, a specific detail of the accessory position is adjusted by modifying a frame along the y-axis. Such a frame may be a bounding box (such as a rectangular prism) that helps manage spatial characteristics of the accessory. Such a frame may also help allow a user to manipulate the accessory itself rather than a slider. Such modifications may be made using a slider, a gimbal, or by entering text-based modifications. There may be a maximum change in the negative y-axis direction and a maximum change in the positive y-axis direction. The change may be stored as a signed percentage value of the allowable change, where the sign of the percentage indicates a direction. The change may also be stored as a linear value (such as in studs). The change may be applied proportionally to the y-axis position constraints. There may also be a check for policy violating adjustments prior to or immediately after implementation (e.g., reports of violative behavior and/or using a moderation pipeline). Block 904 may be followed by block 906.

At block 906, a specific detail of the accessory position is adjusted by modifying a frame along the z-axis. Such a frame may be a bounding box (such as a rectangular prism) that helps manage spatial characteristics of the accessory. Such a frame may also help allow a user to manipulate the accessory itself rather than a slider. Such modifications may be made using a slider, a gimbal, or by entering text-based modifications. There may be a maximum change in the negative z-axis direction and a maximum change in the positive z-axis direction. The change may be stored as a signed percentage value of the allowable change, where the sign of the percentage indicates a direction. The change may also be stored as a linear value (such as in studs). The change may be applied proportionally to the z-axis position constraints. There may also be a check for policy violating adjustments prior to or immediately after implementation (e.g., reports of violative behavior and/or using a moderation pipeline). Block 906 may be followed by block 908.

At block 908, a specific detail of the accessory rotation is adjusted by modifying a frame along the x-axis. Such modifications may be made using a slider, a gimbal, or by entering text-based modifications. There may be a maximum change in the negative x-axis direction and a maximum change in the positive x-axis direction. The change may be stored as a signed percentage value of the allowable change, where the sign of the percentage indicates a direction. The change may also be stored as a linear value (such as in studs). The change may be applied proportionally to the x-axis rotation constraints. There may also be a check for policy violating adjustments prior to or immediately after implementation (e.g., reports of violative behavior and/or using a moderation pipeline). Block 908 may be followed by block 910.

At block 910, a specific detail of the accessory rotation is adjusted by modifying a frame along the y-axis. Such modifications may be made using a slider, a gimbal, or by entering text-based modifications. There may be a maximum change in the negative y-axis direction and a maximum change in the positive y-axis direction. The change may be stored as a signed percentage value of the allowable change, where the sign of the percentage indicates a direction. The change may also be stored as a linear value (such as in studs). The change may be applied proportionally to the y-axis rotation constraints. There may also be a check for policy violating adjustments prior to or immediately after implementation (e.g., reports of violative behavior and/or using a moderation pipeline). Block 910 may be followed by block 912.

At block 912, a specific detail of the accessory rotation is adjusted by modifying a frame along the z-axis. Such modifications may be made using a slider, a gimbal, or by entering text-based modifications. There may be a maximum change in the negative z-axis direction and a maximum change in the positive z-axis direction. The change may be stored as a signed percentage value of the allowable change, where the sign of the percentage indicates a direction. The change may also be stored as a linear value (such as in studs). The change may be applied proportionally to the z-axis rotation constraints. There may also be a check for policy violating adjustments prior to or immediately after implementation (e.g., reports of violative behavior and/or using a moderation pipeline). Block 912 may be followed by block 914.

At block 914, a specific detail of the accessory scale is adjusted by modifying a handle size for the accessory. Block 914 corresponds to an implementation in which the scaling is uniform along the x-axis, the y-axis, and the z-axis. In some implementations, the scaling may be on a per-axis basis. The change may be stored as a percentage or as a linear value (such as in studs). The scaling may increase or decrease the accessory's size proportionally to a scaling factor (whether uniformly or per-axis). The change may be applied proportionally to the scaling factor (whether universal or axis-by-axis). There may also be a check for policy violating adjustments prior to or immediately after implementation (e.g., reports of violative behavior and/or using a moderation pipeline).

Figure 10:
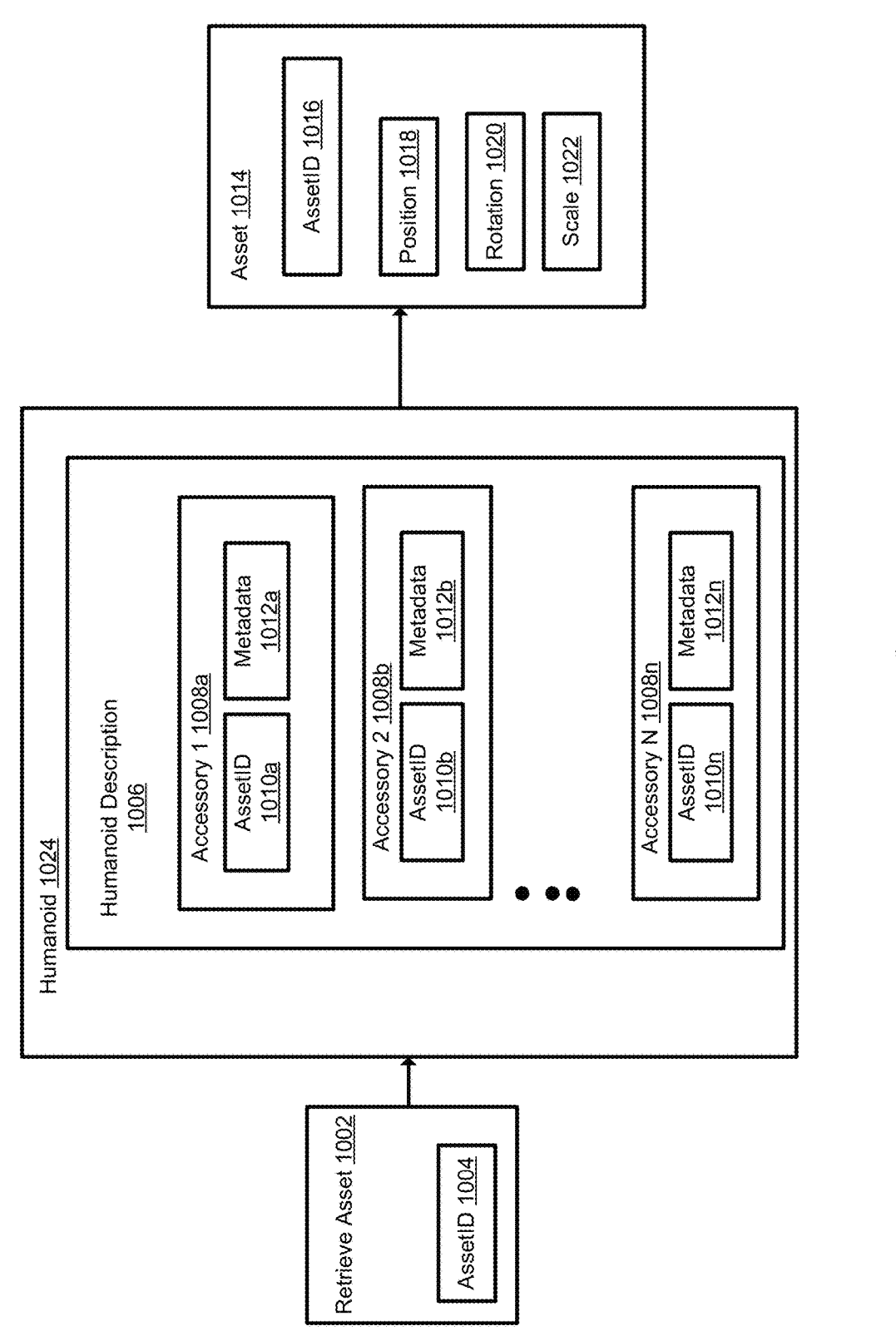
FIG. 10 illustrates a diagram of retrieving an accessory using an asset identifier, in accordance with some implementations.

FIG. 10—Retrieving an Asset

FIG. 10 illustrates a diagram of retrieving an accessory using an asset identifier 1000, in accordance with some implementations. For example, FIG. 10 illustrates the operation of a software method Retrieve Asset 1002 (used to retrieve a specific asset with its metadata). Retrieve Asset 1002 may be called with an integer parameter that is an AssetID 1004 used to specify which asset is being requested.

Such a software method may be one new software method from a group of new software methods defined for a Humanoid Description 1006 class, where the Humanoid Description class includes software methods to manage assets (such as accessories) and metadata for a Humanoid (e.g., an avatar for a player).

In some implementations, the ability is added to adjust the offset/rotation/scale of accessories in the avatar editor. A corresponding UI to do this is also added. Currently, assets in the avatar editor are tracked by their AssetID. Such an AssetID may be an integer value that is associated with a given asset or accessory. In some implementations, it may be useful to associate an AssetID with the actual 3D instance in order to add a selection box to the accessory so that it is possible to visualize a particular accessory that is being adjusted (such as in an editor program, a store program, or a web editor program).

In alternative approaches, given an accessory instance there is no way to tell what its AssetID actually is. Thus, when a user opens the page to adjust an accessory a set of software methods provided in implementations is used to get the accessory instance in order to add a selection box to this instance (of an accessory/asset). This technique may allow developers who create their own avatar editors to be able to incorporate an accessory adjustment section. So, developers can use this set of software methods to incorporate the benefits related to accessory adjustment.

In some implementations, adjustment features may be provided to any instance that may be attached to the character, not just an accessory. In such implementations, Retrieve Asset 1002 returns an array of instances, since some assets may be associated with more than one instance.

Thus, when called, Retrieve Asset 1002 returns one or more instances (such as in an array) that were created from the AssetID provided. The function returns an error if used on a Humanoid 1024 (where a Humanoid 1024 may refer to an avatar associated with at least one accessory) that does not have an applied Humanoid Description 1006. Such a Humanoid Description 1006 provides metadata, the metadata including the information that is used to manage adjustments, since asset metadata for a Humanoid 1024 only has useful data when description metadata including information related to the adjustments is included in the Humanoid Description 1006.

For example, Retrieve Asset 1002 may be used by creating an accessory with an appropriate AssetID 1004 (such as an integer) used to identify and access the accessory. An instance of an accessory can be retrieved from a description associated with a Humanoid 1024 using this technique, stored in a Humanoid Description 1006 of Humanoid 1024. It may then be possible to use the accessory in various ways, such as by accessing various metadata. The metadata may characterize adjustments to the accessory or may be used to render the accessory based on the adjustments (such as a still image, a thumbnail, or an animation).

In some implementations, an AssetID field is added to an Accessory instance. It may be possible to obtain an Accessory instance by looping through all accessories on a character checking this field. However, this approach may lead to edge cases where accessories may not necessarily have these AssetIDs. This results in an error.

Alternatively, in some implementations, there may be an AssetID for the various ways an accessory can be inserted into the workspace, such that AssetIDs are guaranteed to have a corresponding Accessory instance. It may also be necessary to make this property serializable (such that an object can be converted to and from a byte stream for communication purposes) and replicable. This also restricts usage to Accessory instances, not any instance inside a Humanoid's description.

A software method to write information for assets within an avatar editor's services may be updated internally to account for new metadata representing adjustment for each accessory. This is updating is applicable to software methods to update an outfit, create an outfit, and save an avatar with its description. Various parameter get/retrieval functions may automatically parse the newly added JSON fields to allow easy access to the parameters. A function to retrieve avatar rules (i.e., limitations) from avatar editor services may be updated to return new information (e.g., the adjustments) from the backend.

In some implementations, adjustment constraints may be added for each accessory type. These constraints are the allowed changes in position, rotation and scale for each accessory type. Implementations may also add an array of accessory types along with the corresponding constraints in position, rotation and scale for each type.

FIG. 10 illustrates Retrieve Asset 1002 as a function call to retrieve at least one instance. For example, Retrieve Asset 1002 may be associated with AssetID 1004 as a parameter, where AssetID 1004 identifies at least one asset to be retrieved from a Humanoid Description 1006 associated with a Humanoid 1024. Humanoid Description 1006 is associated with N accessories (where N is a positive integer). Specifically, Humanoid Description 1006 includes accessory 1 1008a having AssetID 1010a and metadata 1012a, accessory 2 1008b having AssetID 1010b and metadata 1012b, through accessory N 1008n having AssetID 1010n and metadata 1012n.

Upon receipt of a call to Retrieve Asset 1002, based on AssetID 1004, the rendering engine may identify a matching asset 1014. The matching asset 1014 may be associated with an AssetID 1016, which matches AssetID 1004 (used as an identifier to retrieve the matching asset 1014). The matching asset 1014 also provides as associated metadata the adjustment information position 1018, rotation 1020, and scale 1022.

While FIG. 10 illustrates retrieving only one asset 1014, in some implementations there may be an array of instances of assets returned by Retrieve Asset 1002, since some assets can be associated with more than one instance.

Figure 11:
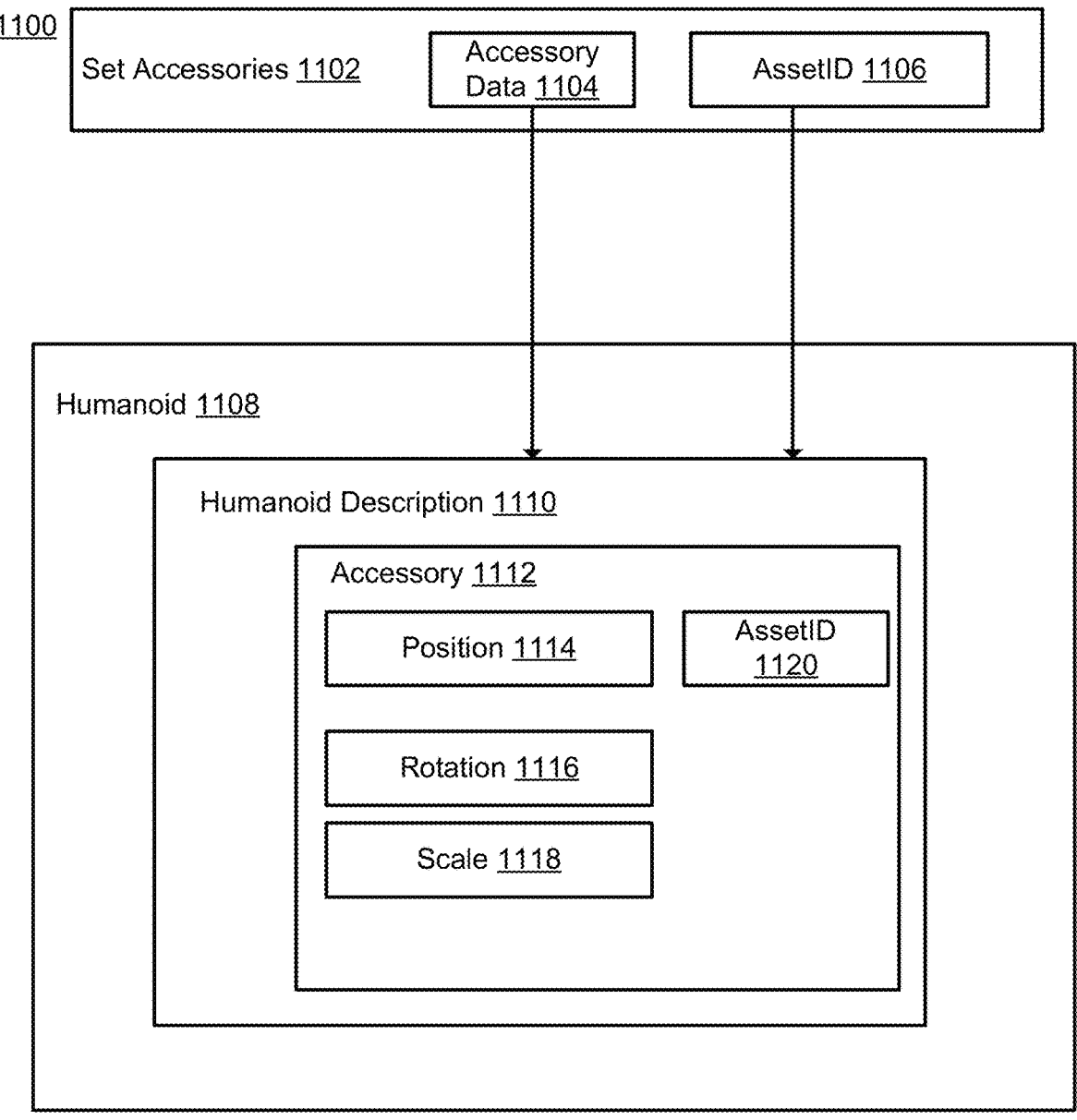
FIG. 11 illustrates a diagram of setting parameters of an accessory using an asset identifier, in accordance with some implementations.

FIG. 11—Setting Accessory Parameters

FIG. 11 illustrates a diagram of setting parameters of an accessory using an asset identifier 1100, in accordance with some implementations. For example, FIG. 11 illustrates the operation of a software method Set Accessories 1102 (used to set metadata for one or more accessories). Set Accessories 1102 is a software method to store adjustment data in association with accessory metadata to persist the adjustment data. Set Accessories 1102 may be called with a parameter that may be an array including information to store at the instance of Humanoid Description 1110 that calls it.

In some implementations, an ability is added to adjust the offset/rotation/scale of accessories in the avatar editor (or an avatar store). In some implementations, it may be possible to store this data inside metadata stored in a Humanoid Description 1110 describing a Humanoid 1108 and apply the data for rendering when avatars load in games (i.e., virtual experiences).

In the avatar editor, when a user adjusts an accessory, the software method Set Accessories 1102 may be called to set these changes in the Humanoid Description 1110. A software method to apply the information from Humanoid Description 1110 to see these changes applied (such as in an animation or rendered image or thumbnail of Humanoid 1108. When avatars load in a game, accessory adjustment data is retrieved using an avatar fetching software method call.

The metadata is stored inside Humanoid Description 1110 to be applied when avatars load. Organizing and using metadata in this manner may allow developers that create their own avatar editors to be able to have an accessory adjustment section (with respect to position, rotation, and scale). Developers can use this for their benefit by making accessory manipulation much easier and more efficient.

There may be an existing software method for Set Accessories (from existing software methods to change properties of accessories) that already takes an array of accessory information. Each entry specifies for an individual accessory attributes such as the AccessoryType, AssetID, IsLayered, Order and Puffiness (these attributes may be pertinent to accessories that involve layered clothing). Some of these attributes are illustrated as being associated with an Asset in markup language using JSON in FIG. 6. For accessory adjustment, three fields are added to accessories. Specifically, accessory adjustments includes fields for Position, Rotation and Scale.

An existing Set Accessories software method may a good candidate to add these 3 fields to its existing array of accessories. This provides consistency for setting accessory information as opposed to creating a new set of software methods. Hence, in some implementations, accessory adjustment information is added to the existing Set Accessories software method, which may have as its calling parameter an array. To do this, three fields are added: Position, Rotation and Scale. Position and Rotation each have the fields: x, y, and z. Each of these fields may be between −1 and 1, referring to a percentage of an allowed adjustment to the accessory. Alternatively, the amount of the adjustment may be stored as a linear value, such as studs. Scale may have one field, x, for some implementations in which scaling is uniform but other implementations may provide x, y, and z fields as alternatives for non-uniform scaling. For scaling, the value may indicate where a multiplier applied to the size of the accessory falls within a range of allowable size values.

The rendering engine may determine what each percentage (or linear value) means in terms of where an accessory is adjusted/retrieved from a function call to retrieve corresponding avatar rules. If the call to retrieve avatar rules fails, the rendering engine may be unable to determine the constraints on adjustment types. To avoid problems, the rendering engine ignores any adjustment. The rendering engine may verify that supplied AssetIDs are actually equipped on the avatar and are allowed to be adjusted (for example, in some implementations, adjustment is only allowed for non-layered accessories).

The rendering engine may ignore any supplied fields that are not equipped or allowed for adjustment. Given a percentage (or linear value), the rendering engine may determine what position/rotation/scale that percentage (or linear value) means based on what constraints that are imposed on accessory types. (i.e. a Hat accessory can only be scaled from 0.5->1.5 x or can only be offset by 1 stud (where a stud is an example linear value in a virtual experience) in an x-direction). This information may be replicated and/or copied when copying a Humanoid Description 1110.

FIG. 11 illustrates a software method Set Accessories 1102. The software method includes accessory data 1104 and AssetID 1106. Such accessory data 1104 includes various metadata, some of which is adjustment data. The software method Set Accessories 1102 interacts with Humanoid 1108 to access its Humanoid Description 1110.

By performing software method Set Accessories 1102, AssetID 1106 is matched to an AssetID 1120 to allow for storage of accessory data 1104 with corresponding accessory 1112 of Humanoid Description 1110 of Humanoid 1108. Accessory 1112 is then updated with metadata for position 1114, rotation 1116, and scale 1118. Accessory 1112 corresponds to the function call because AssetID 1106 matches AssetID 1120.

Figure 12:
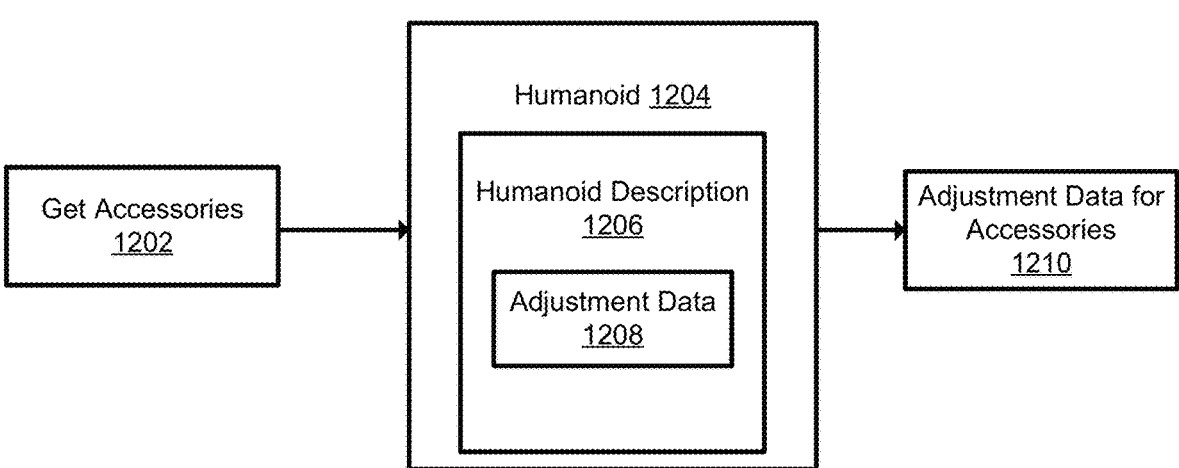
FIG. 12 illustrates a diagram of retrieving parameters of accessories for an avatar, in accordance with some implementations.

FIG. 12—Retrieving Accessory Parameters

FIG. 12 illustrates a diagram of retrieving parameters of accessories for an avatar 1200, in accordance with some implementations. For example, FIG. 12 illustrates the operation of a software method Get Accessories 1202 (used to retrieve metadata for accessories associated with a Humanoid). Get Accessories 1202 does not use additional parameters but Get Accessories 1202 is called as a software method of a Humanoid Description 1206.

The existing software methods already return accessory information stored in the Humanoid Description 1206 of a given Humanoid 1204. In some implementations, adjustment information is added to the array that is returned (if any adjustment information exists). This capability is useful for developers who create their own avatar editors.

The developers may be able to use this function to see if any players have already adjusted any accessories. This function may return an array of data similar to the set function. For example, there may be a call to software method Get Accessories 1202, which is passed to Humanoid 1204. Humanoid 1204 may be associated with Humanoid Description 1206, which includes adjustment data 1208. In response to the call to software method Get Accessories 1202, Humanoid 1204 provides adjustment data for accessories 1210 from Humanoid Description 1206 for accessories associated with the Humanoid 1204.

Figure 13A:
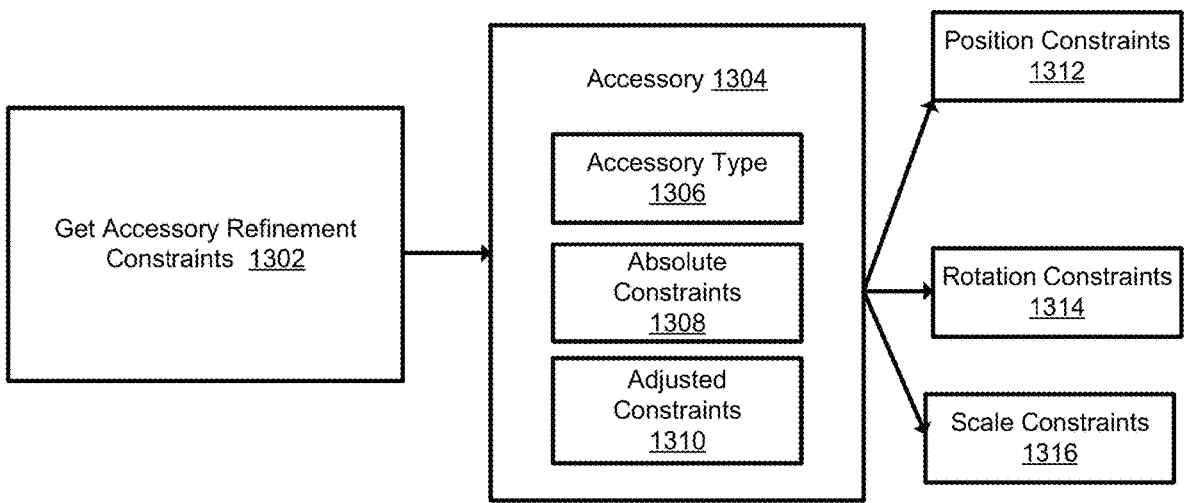
FIG. 13A illustrates a diagram of retrieving parameters of accessories for an avatar, in accordance with some implementations.

FIG. 13A—Retrieving Accessory Parameters from Avatar

FIG. 13A illustrates a diagram of retrieving parameters of accessories for an avatar 1300a, in accordance with some implementations. For example, FIG. 13 illustrates the operation of a software method Get Accessory Refinement Constraints 1302 (used to determine limit and/or constraint information associated with a specific accessory). Get Accessory Refinement Constraints 1302 takes as its parameter an accessory instance. Unlike the other new software methods calls, which are called from a Humanoid Description, Get Accessory Refinement Constraints 1302 is called from an avatar editor service (or potentially another source such as an avatar store) that has information about relevant avatar constraints.

In order to figure out what refinement constraints are on an accessory, access to how the accessory has been scaled is necessary. This information is used because constraints are determined on an unscaled accessory. However, with such information, the rendering engine can compensate.

In some implementations, it may be helpful for developers to easily access this information as well in order to create their own accessory adjustment features. The Get Accessory Refinement Constraints 1302 function may return the exact refinement constraints allowed on a given accessory. A parameter to such a function is an accessory instance type whose constraints are to be ascertained. To successfully perform this function, the accessory in question is assumed to have a handle, an original size, and attachment data that exist.

This function may get avatar rules to determine the constraints. From the accessory instance the function retrieves the accessory type. From the current size of the handle and its original size the function Get Accessory Refinement Constraints 1302 determines the scale of the accessory. The function may return a three-dimensional vector, which may be a size of a bounding box centered on the accessory's attachment point that describes the allowed refinement.

As illustrated in FIG. 13, there may be a call to a software method Get Accessory Refinement Constraints 1302. The software method has as its parameter an accessory instance whose constraints are to be determined. The accessory instance may correspond to accessory 1304. The accessory 1304 may be associated with an accessory type 1306, absolute constraints 1308 (based on the type of accessory), and adjusted constraints 1310 (based on user adjustments). In response to the software method call, position constraints 1312, rotation constraints 1314, and scale constraints 1316 are returned. Each of position constraints 1312, rotation constraints 1314, and scale constraints 1316 may include absolute and adjusted constraint (limit) data.

Figure 13B:
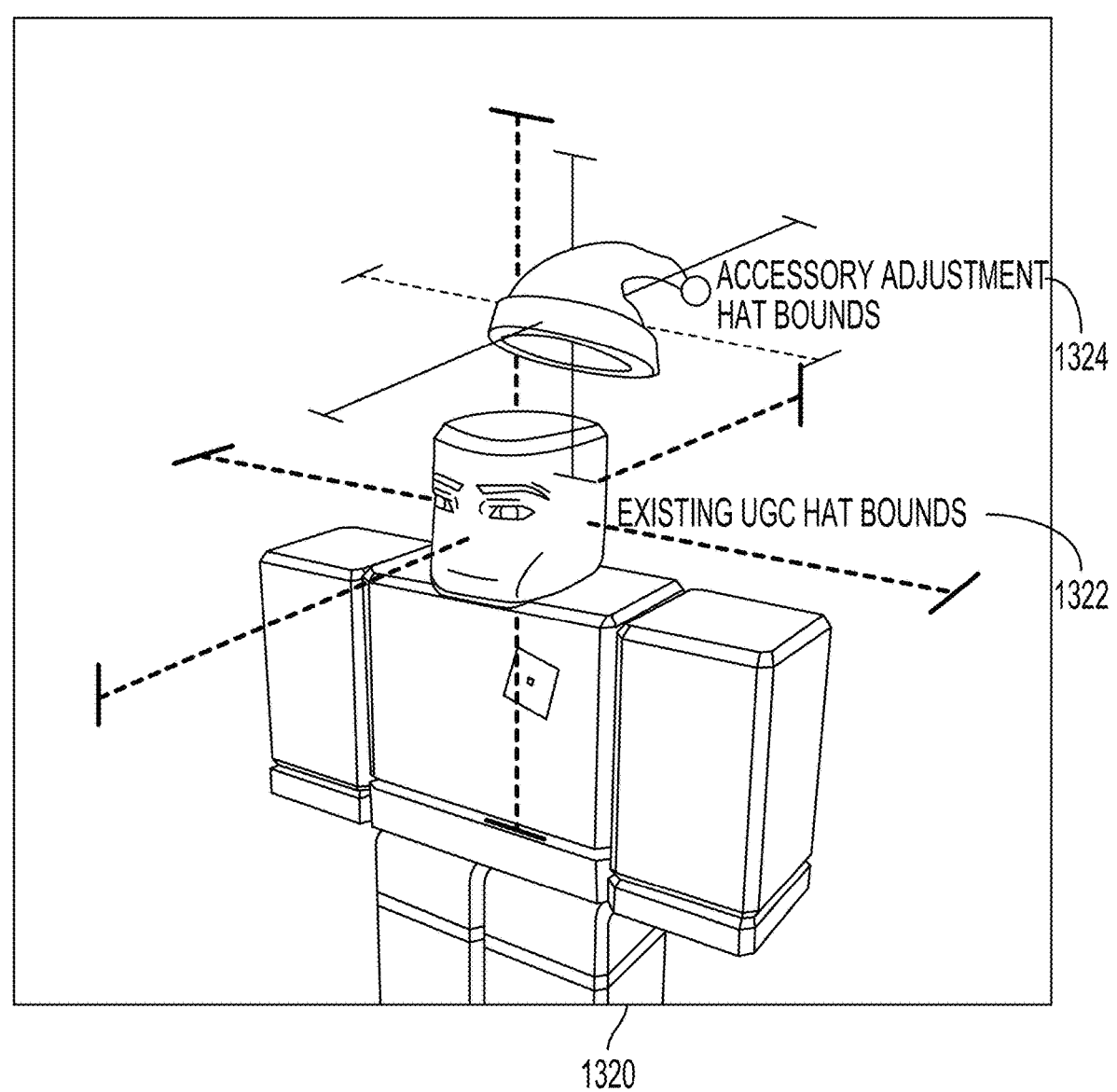
FIG. 13B illustrates a diagram of an avatar with associated absolute and user-adjusted boundaries at default positions, in accordance with some implementations.

FIG. 13B—Avatar with Boundaries

FIG. 13B illustrates a diagram of an avatar with associated absolute and user-adjusted boundaries at default positions 1300b, in accordance with some implementations. Avatar 1320 has a hat accessory positioned above the head of avatar 1320. FIG. 13B illustrates existing UGC hat bounds 1322 and accessed adjusted hat bounding box 1324.

For constraining adjustments (such as to respect the user generated content (UGC) creator and prevent inappropriate adjustment(s)), offset-based bounds are used. For example, a player may only move an accessory a certain distance (such as 0.5 studs or another linear value along each axis from the default position).

Such initial constraints may be predefined on the backed. These constraints may start from the center of the accessory. However, there may also be absolute overarching constraints based on UGC creation bounds that can never be exceeded (e.g., to avoid breaking the game engine).

For example, an accessory may be associated with an asset type. Examples of asset types may include a head accessory, a face accessory, a back accessory, a shoulder accessory, a neck accessory, a waist accessory, or a front accessory. However, these are only example types of accessories, and in some implementations, other types of accessories may be defined and/or used. As noted, accessories are specific types of assets that may be fitted to avatars.

As examples of adjustment constraints, a head accessory may have as position adjustment constraints of X:1 stud, Y:1 stud, Z:1 stud, as rotation adjustment constraints 360° on all axes (no restrictions), and as scale adjustment constraints 0.5 x-1.5 x. However, these values (as well as those listed below) are only sample constraints. Constraints may be set based on user preferences in a data-driven manner, so long as the constraints do not violate absolute constraints that would not work with the engine.

As examples of adjustment constraints, a face accessory may have as position adjustment constraints of X:1 stud, Y:1 stud, Z:1 stud, as rotation adjustment constraints 360° on all axes (no restrictions), and as scale adjustment constraints 0.5 x-1.5 x.

As examples of adjustment constraints, a back accessory may have as position adjustment constraints of X:1 stud, Y:1 stud, Z:1 stud, as rotation adjustment constraints X: 60° (+30° and −30°), Y:60° (+30° and −30°), Z:360° (no restrictions) and as scale adjustment constraints 0.8 x-1.2 x.

As examples of adjustment constraints, a shoulder accessory may have as position adjustment constraints of X:1 stud, Y:1 stud, Z:1 stud, as rotation adjustment constraints 90° on all axes (+45° and −45°), and as scale adjustment constraints 0.5 x-1.5 x.

As examples of adjustment constraints, a neck accessory may have as position adjustment constraints of X:1 stud, Y:1 stud, Z:1 stud, as rotation adjustment constraints 360° on all axes (no restrictions), and as scale adjustment constraints 0.5 x-1.5 x.

As examples of adjustment constraints, a waist accessory may have as position adjustment constraints of X:0.5 studs, Y:0.25 studs, Z:0.25 studs, as rotation adjustment constraints 60° (+30° and −30°) on all axes, and as scale adjustment constraints 0.8 x-1.2 x.

As examples of adjustment constraints, a front accessory may have as position adjustment constraints of X:0.5 studs, Y:0.25 studs, Z:0.25 studs, as rotation adjustment constraints 60° (+30° and −30°) on all axes, and as scale adjustment constraints 0.8x-1.2x.

In some implementations, there may be mechanisms for proactively preventing inappropriate adjustments. Rotations of back/waist/front accessory assets can be the most egregious ones for abuse. Such mechanisms may include detecting inappropriate images and shapes that result from changing the position/rotation of a given accessory. For example, changing the position/rotation of a given accessory may expose an image or a shape that was previously hidden, which constitutes an inappropriate adjustment.

Constraints may not change based on asset size. Constraints are not concerned with the size of the asset. It may seem that larger assets are not able to be moved as much, but this is not a concern.

FIG. 13B illustrates a visualization of two bounds. FIG. 13B illustrates an avatar 1320 with a hat accessory positioned above the head of avatar 1320. First, there are existing UGC hat bounds 1322 that define an absolute bounding box. Second, there is a smaller bounding box for accessory adjustment hat bounds 1324 originating from the asset center that defines the adjustment constraints.

Figure 13C:
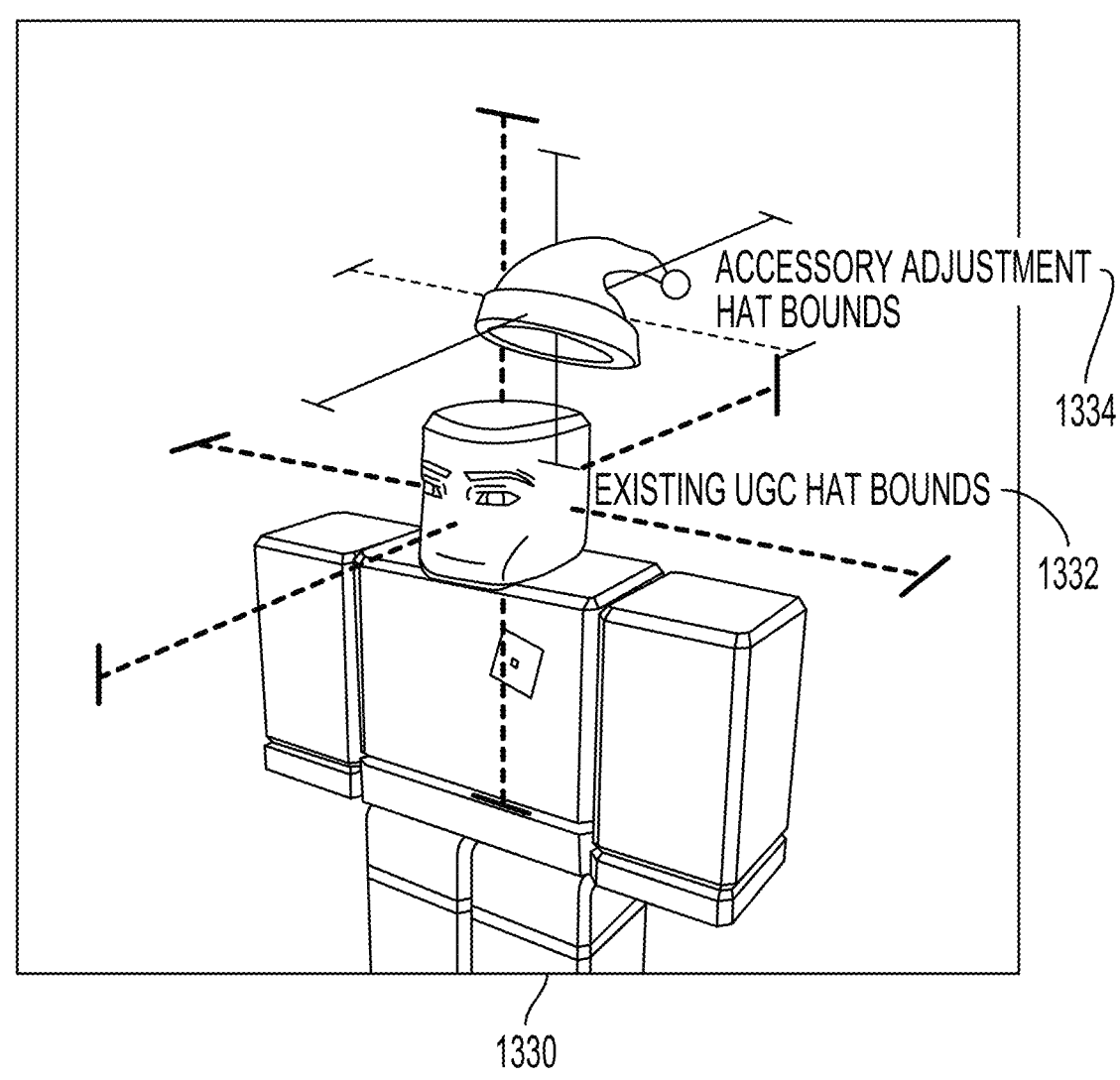
FIG. 13C illustrates a diagram of an avatar with associated absolute and user-adjusted boundaries, in accordance with some implementations.

FIG. 13C—Avatar with Boundaries

FIG. 13C illustrates a diagram of an avatar with associated absolute and user-adjusted boundaries 1300c, in accordance with some implementations. FIG. 13C is a successful case in which accessory adjustment hat bounds 1334 are completely within a UGC creation bounding box for existing UGC hat bounds 1332. For example, FIG. 13C illustrates a case where the hat is near the middle of the head of avatar 1330. The contents of FIG. 13B and FIG. 13C are similar. However, FIG. 13B is discussed with respect to general principles of positioning accessories, while FIG. 13C shows a particular accessory where it is positioned in a way that does not cause any concerns or problems, based on the relationship between accessory adjustment hat bounds 1334 and a UGC creation bounding box for existing UGC hat bounds 1332.

Figure 13D:
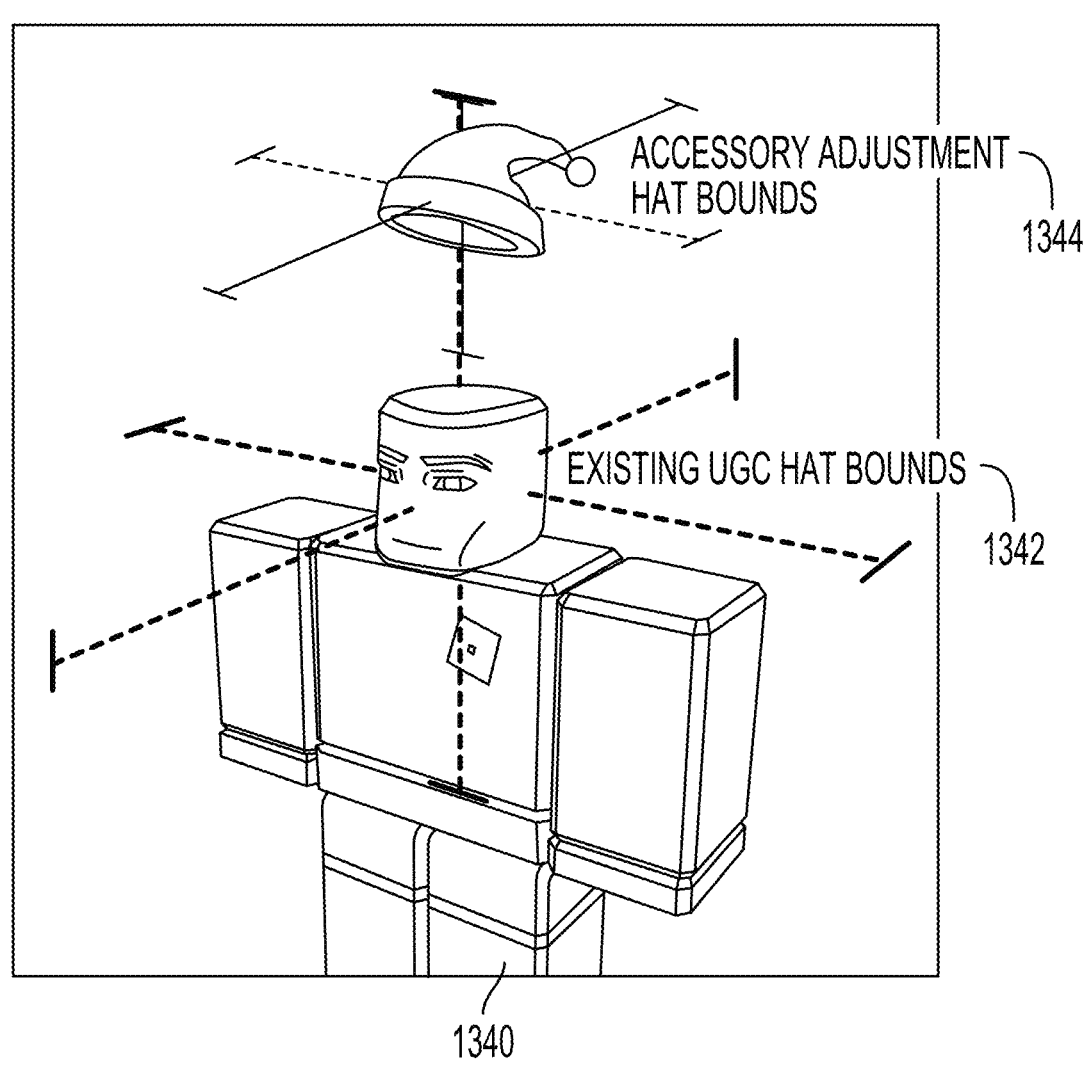
FIG. 13D illustrates a diagram of an avatar with associated absolute and user-adjusted boundaries as an edge case, in accordance with some implementations.

FIG. 13D—Avatar with Boundaries

FIG. 13D illustrates a diagram of an avatar with associated absolute and user-adjusted boundaries as an edge case 1300*d*, in accordance with some implementations. FIG. 13D illustrates an edge case because the hat is near the top of the absolute Y-constraint. Accordingly, in this case, the accessory adjustment hat bounds 1344 are not completely within the UGC creation bounding box for existing UGC hat bounds 1342 (here, the hat is near the top of the absolute Y-constraint). For example, FIG. 13D illustrates a case where the hat is near the middle of the head of avatar 1340. While FIGS. 13B and 13C show cases where the accessory is fully inside relevant boundaries, FIG. 13D presents an edge case.

Figure 13E:
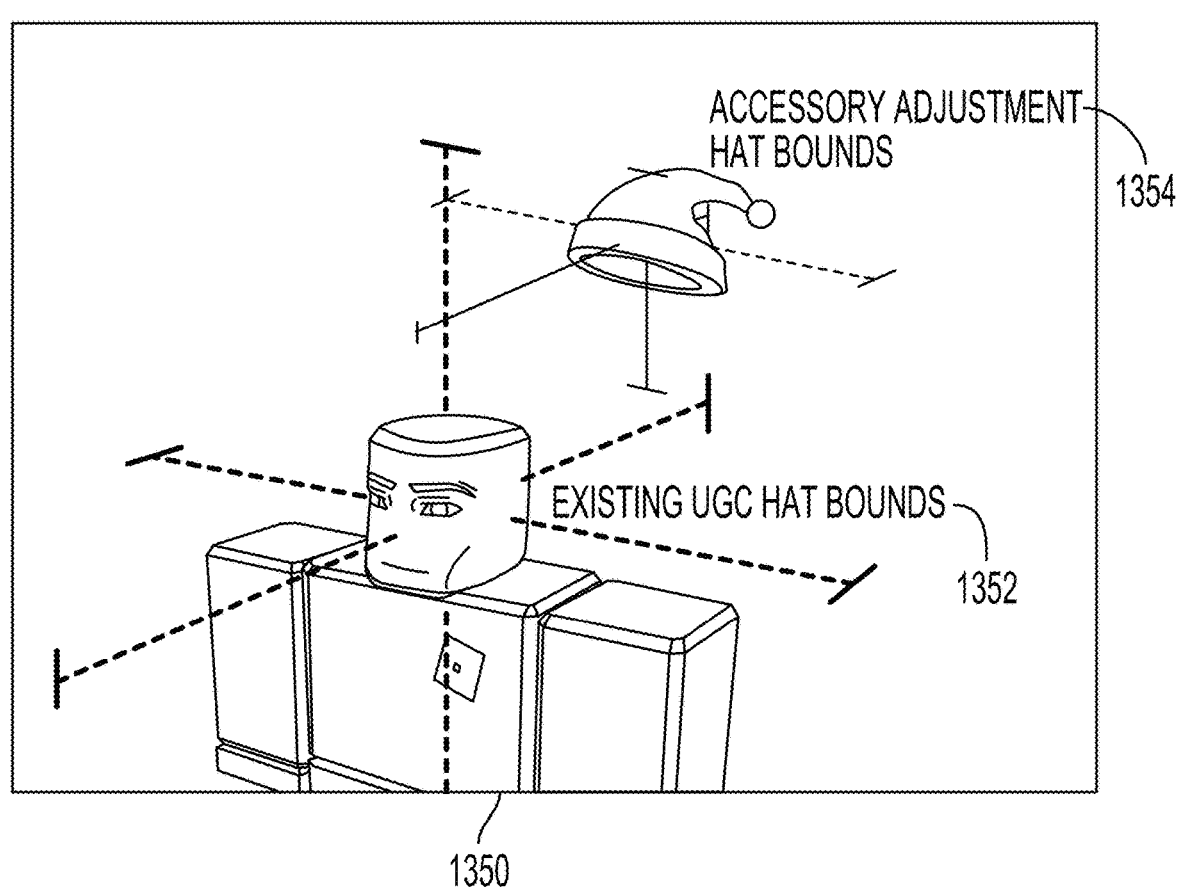
FIG. 13E illustrates a diagram of an avatar with associated absolute and user-adjusted boundaries as another edge case, in accordance with some implementations.

FIG. 13E—Avatar with Boundaries

FIG. 13E illustrates a diagram of an avatar with associated absolute and user-adjusted boundaries as another edge case 1300*e*, in accordance with some implementations. FIG. 13E illustrates an edge case because the hat is near the top of the absolute Y-constraint and absolute Z-constraint. Accessory adjustment bounds 1354 are at the very edge of the UGC creation bounding box for existing UGC hat bounds 1352 (the hat is at the edge of the absolute Y-constraint and Z-constraint). For example, FIG. 13E illustrates a case where the hat is near the middle of the head of avatar 1350. While FIGS. 13B and 13C show cases where the accessory is fully inside relevant boundaries, FIG. 13E presents an edge case (but with more issues than FIG. 13D).

Figure 14:
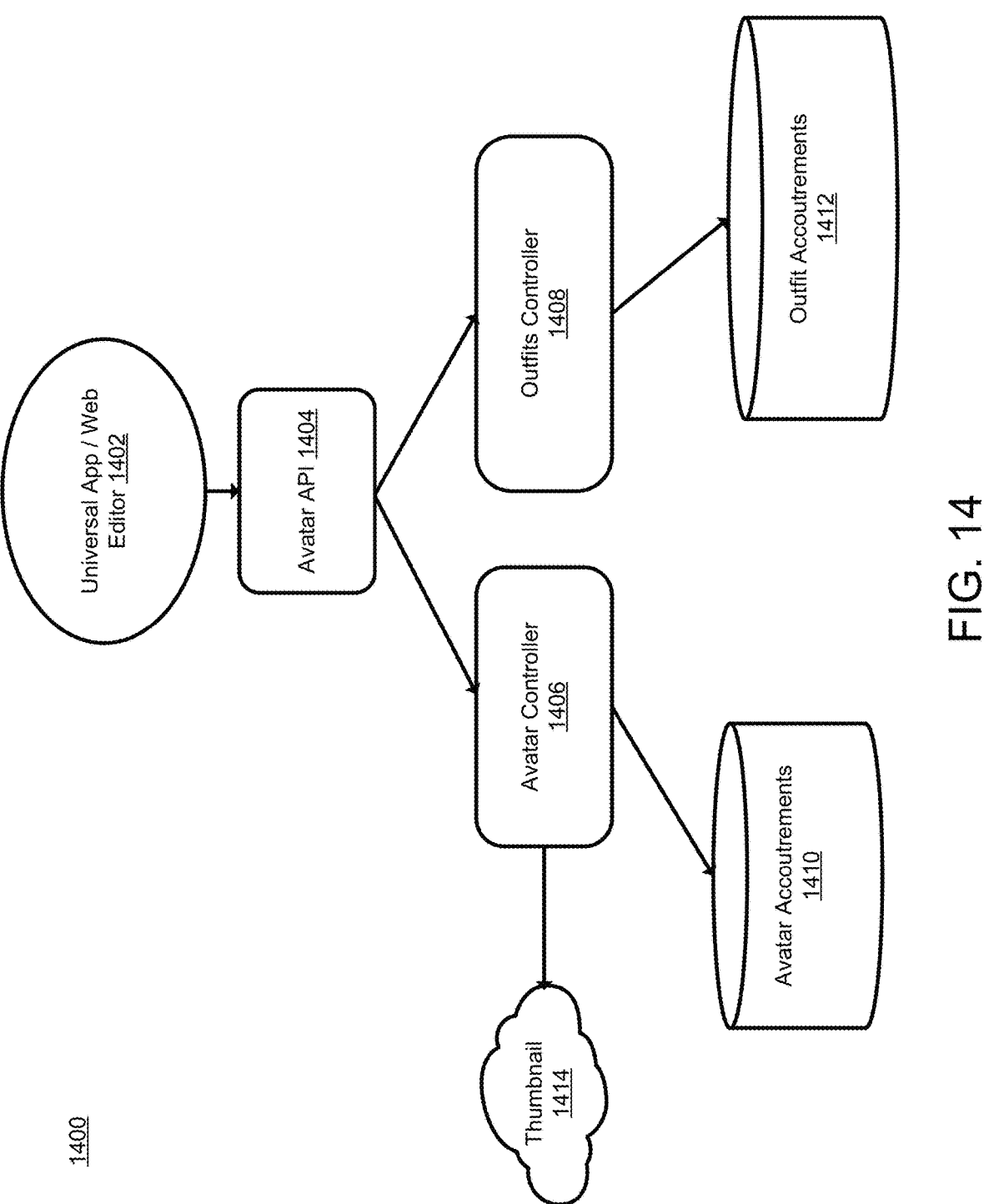
FIG. 14 is a diagram illustrating components of a system configured to adjust rigid accessories, in accordance with some implementations.

FIG. 14—System to Adjust Rigid Accessories

FIG. 14 is a diagram illustrating components of a system configured to adjust rigid accessories 1400, in accordance with some implementations. Initially, a universal app (such as an editor program or a store program, as discussed herein) or web editor 1402 receives user input about how to modify an accessory. The information is provided to an avatar API 1404. The avatar API 1404 sends the requisite information to an avatar controller 1406 and an outfits controller 1408. The avatar controller 1406 communicates with a storage for avatar accoutrements 1410 and a thumbnail 1414. The outfits controller 1408 communicates with a storage for outfit accoutrements 1412. For example, accoutrements may be another term used to refer to accessories and related information.

Information used for accessory adjustment may be position, rotation, and/or scale per accessory that is adjusted. This new information may be consumed through various aspects of a data model and stored with avatar accoutrements 1410 and outfits accoutrements 1412 as metadata. For example, as discussed above, the metadata may be stored in a markup language such as JSON.

Avatar APIs are currently used by a universal app and web editor to save and persist the wearing assets on a user's active avatar. This process triggers new thumbnail generation when a hash value associated with an avatar change. The outfits aspects of the Avatar API are used to create and update outfits in a characters/creations tab of the web editor and universal app.

The accoutrements data consumed through the avatar assets is stored and persisted in a database or another storage that contains information about avatar accoutrements 1410. The outfits and its accoutrements data is stored in another database or another storage that contains information about outfit accoutrements 1412.

For example, if the accoutrements data is stored in a relational database or another form of storage (such as cloud storage), the accoutrements data may be stored using tables and/or markup language (such as JSON, as discussed). The data model currently contains layered clothing metadata such as key-value pairs for order and puffiness and is stored in the existing meta field column in the avatar accoutrements 1410 storage and outfits accoutrements 1412 storage.

New information used for accessory adjustment is position, rotation and scale per accessory that is adjusted. In implementations, such information is stored with the existing metadata fields for an asset in an avatar and in an outfit, which are stored in avatar accoutrements 1410 storage and outfits accoutrements 1412 storage respectively. The data may be appended to the existing metadata field columns on these tables. In some implementations, the metadata field is serialized into a string before the metadata is stored in the tables.

No schema change may be specified for any of these tables. The position, rotation, and/or scale values may be stored similarly to and along with the other existing meta fields inside accoutrements which is currently stored in avatar accoutrements 1410 storage. Changing the metadata models may also change an API's input model for creating an outfit, managing ID information for user outfits, and updating user outfits, with respect to outfits accoutrements 1412 storage.

The backend may also be able to detect and handle certain kinds of errors. For example, there may be an ineligible accessory (an invalid AssetType), an ineligible asset, or an accessory that violates constraints. These errors may be errors that make it impossible for the system to operate or may be errors in which users attempt to share abusive content. The errors may be detected by checking for specific technical errors and checking for a list of potentially offensive content. For example, violative content may be found based on user reports or a moderation pipeline.

By providing a backend and a user interface with these capabilities, a user or a developer may interact with an editor program, a store program, or even potentially a web editor to select an accessory (e.g., a rigid accessory) to attach to an avatar. The accessory may be associated with a point of attachment for the avatar. An interface (a store program, an editor program, and/or a web editor) may allow a user modify position, rotation, and scaling information for that accessory, such as by using sliders, gimbals, or even text entry.

Such information is then stored as metadata in association with an accessory at a backend, possibly as markup language such as JSON. When rendering the avatar, certain new API calls allow for the retrieval of modified accessories along with their adjustment metadata. The adjustment metadata can then be provided to a rendering engine, allowing to render the adjusted accessories with high visual qualities. Hence, the approaches discussed herein reduce the necessity of duplicate accessories and allow for basic manipulations to accessories with high graphical fidelity at rendering time.

Figure 15:
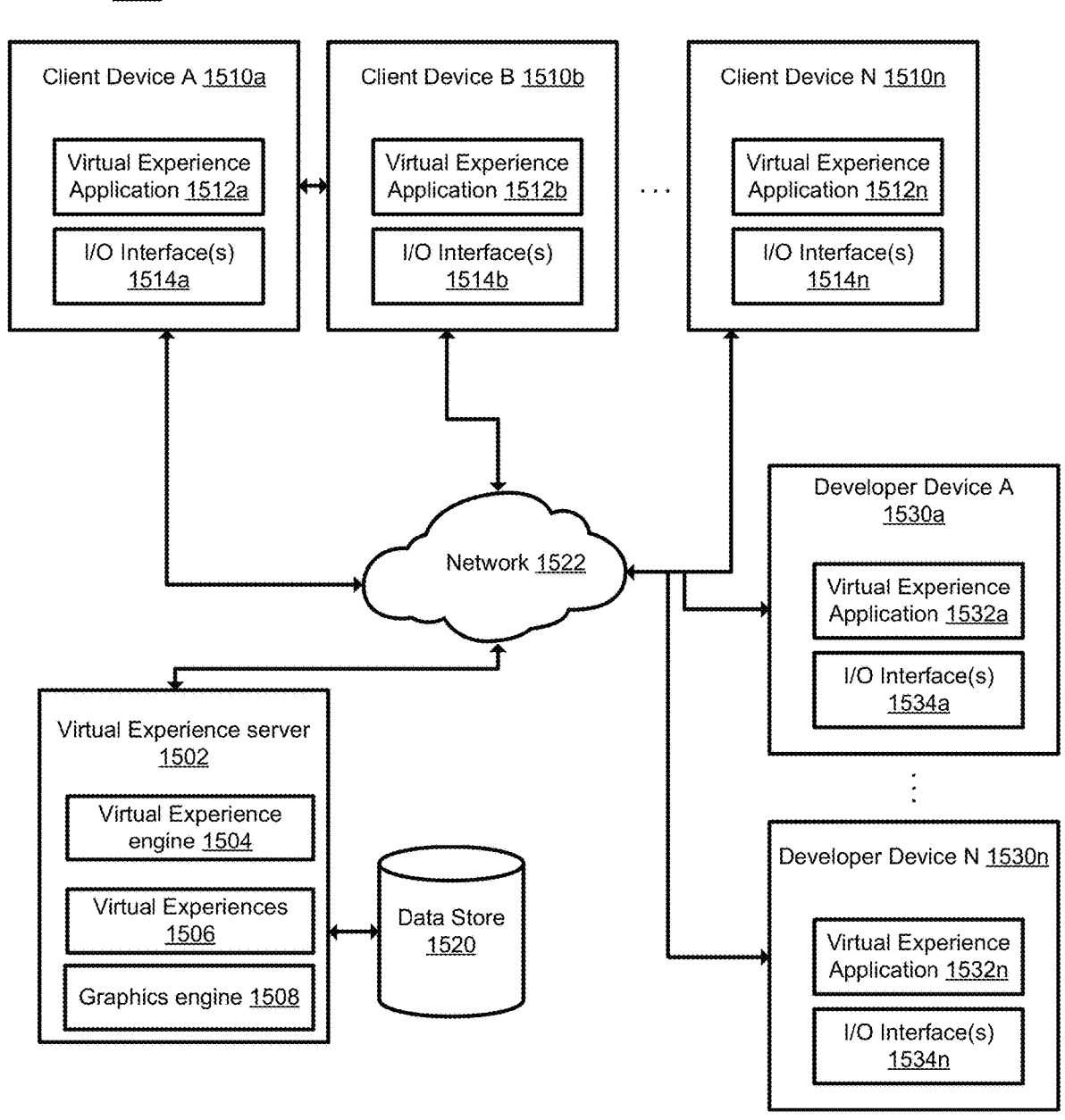
FIG. 15 is a diagram of an example system architecture that includes a 3D environment platform that can support 3D avatars with adjustable accessories, in accordance with some implementations.

FIG. 15—System Architecture

FIG. 15 is a diagram of an example system architecture that includes a 3D environment platform that can support 3D avatars with adjustable accessories, in accordance with some implementations. FIG. 15 and the other figures use like reference numerals to identify similar elements. A letter after a reference numeral, such as "1510," indicates that the text refers specifically to the element having that particular reference numeral. A reference numeral in the text without a following letter, such as "1510," refers to any or all of the elements in the figures bearing that reference numeral (e.g., "1510" in the text refers to reference numerals "1510*a*," "1510*b*," and/or "1510*n*" in the figures).

The system architecture 1500 (also referred to as "system" herein) includes online virtual experience server 1502, data store 1520, client devices 1510*a*, 1510*b*, and 1510*n*

(generally referred to as "client device(s) 1510" herein), and developer devices 1530a and 1530n (generally referred to as "developer device(s) 1530" herein). Virtual experience server 1502, data store 1520, client devices 1510, and developer devices 1530 are coupled via network 1522. In some implementations, client devices(s) 1510 and developer device(s) 1530 may refer to the same or same type of device.

Online virtual experience server 1502 can include, among other things, a virtual experience engine 1504, one or more virtual experiences 1506, and graphics engine 1508. In some implementations, the graphics engine 1508 may be a system, application, or module that permits the online virtual experience server 1502 to provide graphics and animation capability. In some implementations, the graphics engine 1508 and/or virtual experience engine 1504 may perform one or more of the operations described below in connection with the flowcharts shown in FIGS. 7-9. A client device 1510 can include a virtual experience application 1512, and input/output (I/O) interfaces 1514 (e.g., input/output devices). The input/output devices can include one or more of a microphone, speakers, headphones, display device, mouse, keyboard, game controller, touchscreen, virtual reality consoles, etc.

A developer device 1530 can include a virtual experience application 1532, and input/output (I/O) interfaces 1534 (e.g., input/output devices). The input/output devices can include one or more of a microphone, speakers, headphones, display device, mouse, keyboard, game controller, touchscreen, virtual reality consoles, etc.

System architecture 1500 is provided for illustration. In different implementations, the system architecture 1500 may include the same, fewer, more, or different elements configured in the same or different manner as that shown in FIG. 15.

In some implementations, network 1522 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a 5G network, a Long Term Evolution (LTE) network, etc.), routers, hubs, switches, server computers, or a combination thereof.

In some implementations, the data store 1520 may be a non-transitory computer readable memory (e.g., random access memory), a cache, a drive (e.g., a hard drive), a flash drive, a database system, or another type of component or device capable of storing data. The data store 1520 may also include multiple storage components (e.g., multiple drives or multiple databases) that may also span multiple computing devices (e.g., multiple server computers). In some implementations, data store 1520 may include cloud-based storage.

In some implementations, the online virtual experience server 1502 can include a server having one or more computing devices (e.g., a cloud computing system, a rackmount server, a server computer, cluster of physical servers, etc.). In some implementations, the online virtual experience server 1502 may be an independent system, may include multiple servers, or be part of another system or server.

In some implementations, the online virtual experience server 1502 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online virtual experience server 1502 and to provide a user with access to online virtual experience server 1502. The online virtual experience server 1502 may also include a website (e.g., a web page) or application back-end software that may be used to provide a user with access to content provided by online virtual experience server 1502. For example, users may access online virtual experience server 1502 using the virtual experience application 1512 on client devices 1510.

In some implementations, virtual experience session data are generated via online virtual experience server 1502, virtual experience application 1512, and/or virtual experience application 1532, and are stored in data store 1520. With permission from virtual experience participants, virtual experience session data may include associated metadata, e.g., virtual experience identifier(s); device data associated with the participant(s); demographic information of the participant(s); virtual experience session identifier(s); chat transcripts; session start time, session end time, and session duration for each participant; relative locations of participant avatar(s) within a virtual experience environment; purchase(s) within the virtual experience by one or more participants(s); accessories utilized by participants; etc.

In some implementations, online virtual experience server 1502 may be a type of social network providing connections between users or a type of user-generated content system that allows users (e.g., end-users or consumers) to communicate with other users on the online virtual experience server 1502, where the communication may include voice chat (e.g., synchronous and/or asynchronous voice communication), video chat (e.g., synchronous and/or asynchronous video communication), or text chat (e.g., 1:1 and/or N:N synchronous and/or asynchronous text-based communication). A record of some or all user communications may be stored in data store 1520 or within virtual experiences 1506. The data store 1520 may be utilized to store chat transcripts (text, audio, images, etc.) exchanged between participants, with appropriate permissions from the players and in compliance with applicable regulations.

In some implementations, the chat transcripts are generated via virtual experience application 1512 and/or virtual experience application 1532 or and are stored in data store 1520. The chat transcripts may include the chat content and associated metadata, e.g., text content of chat with each message having a corresponding sender and recipient(s); message formatting (e.g., bold, italics, loud, etc.); message timestamps; relative locations of participant avatar(s) within a virtual experience environment, accessories utilized by virtual experience participants, etc. In some implementations, the chat transcripts may include multilingual content, and messages in different languages from different sessions of a virtual experience may be stored in data store 1520.

In some implementations, chat transcripts may be stored in the form of conversations between participants based on the timestamps. In some implementations, the chat transcripts may be stored based on the originator of the message(s).

In some implementations of the disclosure, a "user" may be represented as a single individual. Other implementations of the disclosure encompass a "user" (e.g., creating user) being an entity controlled by a set of users or an automated source. For example, a set of individual users federated as a community or group in a user-generated content system may be considered a "user."

In some implementations, online virtual experience server 1502 may be a virtual gaming server. For example, the gaming server may provide single-player or multiplayer games to a community of users that may access as "system"

herein) includes online virtual experience server 1502, data store 1520, client or interact with virtual experiences using client devices 1510 via network 1522. In some implementations, virtual experiences (including virtual realms or worlds, virtual games, other computer-simulated environments) may be two-dimensional (2D) virtual experiences, three-dimensional (3D) virtual experiences (e.g., 3D user-generated virtual experiences), virtual reality (VR) experiences, or augmented reality (AR) experiences, for example. In some implementations, users may participate in interactions (such as gameplay) with other users. In some implementations, a virtual experience may be experienced in real-time with other users of the virtual experience.

In some implementations, virtual experience engagement may refer to the interaction of one or more participants using client devices (e.g., 1510) within a virtual experience (e.g., 1506) or the presentation of the interaction on a display or other output device (e.g., 1514) of a client device 1510. For example, virtual experience engagement may include interactions with one or more participants within a virtual experience or the presentation of the interactions on a display of a client device.

In some implementations, a virtual experience 1506 can include an electronic file that can be executed or loaded using software, firmware or hardware configured to present the virtual experience content (e.g., digital media item) to an entity. In some implementations, a virtual experience application 1512 may be executed and a virtual experience 1506 rendered in connection with a virtual experience engine 1504. In some implementations, a virtual experience 1506 may have a common set of rules or common goal, and the environment of a virtual experience 1506 shares the common set of rules or common goal. In some implementations, different virtual experiences may have different rules or goals from one another.

In some implementations, virtual experiences may have one or more environments (also referred to as "virtual experience environments" or "virtual environments" herein) where multiple environments may be linked. An example of an environment may be a three-dimensional (3D) environment. The one or more environments of a virtual experience 1506 may be collectively referred to as a "world" or "virtual experience world" or "gaming world" or "virtual world" or "universe" herein. An example of a world may be a 3D world of a virtual experience 1506. For example, a user may build a virtual environment that is linked to another virtual environment created by another user. A character of the virtual experience may cross the virtual border to enter the adjacent virtual environment.

It may be noted that 3D environments or 3D worlds use graphics that use a three-dimensional representation of geometric data representative of virtual experience content (or at least present virtual experience content to appear as 3D content whether or not 3D representation of geometric data is used). 2D environments or 2D worlds use graphics that use two-dimensional representation of geometric data representative of virtual experience content.

In some implementations, the online virtual experience server 1502 can host one or more virtual experiences 1506 and can permit users to interact with the virtual experiences 1506 using a virtual experience application 1512 of client devices 1510. Users of the online virtual experience server 1502 may play, create, interact with, or build virtual experiences 1506, communicate with other users, and/or create and build objects (e.g., also referred to as "item(s)" or "virtual experience objects" or "virtual experience item(s)" herein) of virtual experiences 1506.

For example, in generating user-generated virtual items, users may create characters, decoration for the characters, one or more virtual environments for an interactive virtual experience, or build structures used in a virtual experience 1506, among others. In some implementations, users may buy, sell, or trade virtual experience objects, such as in-platform currency (e.g., virtual currency), with other users of the online virtual experience server 1502. In some implementations, online virtual experience server 1502 may transmit virtual experience content to virtual experience applications (e.g., 1512). In some implementations, virtual experience content (also referred to as "content" herein) may refer to any data or software instructions (e.g., virtual experience objects, virtual experience, user information, video, images, commands, media item, etc.) associated with online virtual experience server 1502 or virtual experience applications. In some implementations, virtual experience objects (e.g., also referred to as "item(s)" or "objects" or "virtual objects" or "virtual experience item(s)" herein) may refer to objects that are used, created, shared or otherwise depicted in virtual experience 1506 of the online virtual experience server 1502 or virtual experience applications 1512 of the client devices 1510. For example, virtual experience objects may include a part, model, character, accessories, tools, weapons, clothing, buildings, vehicles, currency, flora, fauna, components of the aforementioned (e.g., windows of a building), and so forth.

It may be noted that the online virtual experience server 1502 hosting virtual experiences 1506, is provided for purposes of illustration. In some implementations, online virtual experience server 1502 may host one or more media items that can include communication messages from one user to one or more other users. With user permission and express user consent, the online virtual experience server 1502 may analyze chat transcripts data to improve the virtual experience platform. Media items can include, but are not limited to, digital video, digital movies, digital photos, digital music, audio content, melodies, website content, social media updates, electronic books, electronic magazines, digital newspapers, digital audio books, electronic journals, web blogs, real simple syndication (RSS) feeds, electronic comic books, software applications, etc. In some implementations, a media item may be an electronic file that can be executed or loaded using software, firmware or hardware configured to present the digital media item to an entity.

In some implementations, a virtual experience 1506 may be associated with a particular user or a particular group of users (e.g., a private virtual experience), or made widely available to users with access to the online virtual experience server 1502 (e.g., a public virtual experience). In some implementations, where online virtual experience server 1502 associates one or more virtual experiences 1506 with a specific user or group of users, online virtual experience server 1502 may associate the specific user(s) with a virtual experience 1506 using user account information (e.g., a user account identifier such as username and password).

In some implementations, online virtual experience server 1502 or client devices 1510 may include a virtual experience engine 1504 or virtual experience application 1512. In some implementations, virtual experience engine 1504 may be used for the development or execution of virtual experiences 1506. For example, virtual experience engine 1504 may include a rendering engine ("renderer") for 2D, 3D, VR, or AR graphics, a physics engine, a collision detection engine (and collision response), sound engine, scripting functionality, animation engine, artificial intelligence engine, networking functionality, streaming functionality, memory management functionality, threading functionality, scene graph functionality, or video support for cinematics, among other features. The components of the virtual experience engine 1504 may generate commands that help compute and render the virtual experience (e.g., rendering commands, collision commands, physics commands, etc.) In some implementations, virtual experience applications 1512 of client devices 1510, respectively, may work independently, in collaboration with virtual experience engine 1504 of online virtual experience server 1502, or a combination of both.

In some implementations, both the online virtual experience server 1502 and client devices 1510 may execute a virtual experience engine/application (1504 and 1512, respectively). The online virtual experience server 1502 using virtual experience engine 1504 may perform some or all the virtual experience engine functions (e.g., generate physics commands, rendering commands, etc.), or offload some or all the virtual experience engine functions to virtual experience engine 1504 of client device 1510. In some implementations, each virtual experience 1506 may have a different ratio between the virtual experience engine functions that are performed on the online virtual experience server 1502 and the virtual experience engine functions that are performed on the client devices 1510. For example, the virtual experience engine 1504 of the online virtual experience server 1502 may be used to generate physics commands in cases where there is a collision between at least two virtual experience objects, while the additional virtual experience engine functionality (e.g., generate rendering commands) may be offloaded to the client device 1510. In some implementations, the ratio of virtual experience engine functions performed on the online virtual experience server 1502 and client device 1510 may be changed (e.g., dynamically) based on virtual experience engagement conditions. For example, if the number of users engaging in a particular virtual experience 1506 exceeds a threshold number, the online virtual experience server 1502 may perform one or more virtual experience engine functions that were previously performed by the client devices 1510.

For example, users may be playing a virtual experience 1506 on client devices 1510, and may send control instructions (e.g., user inputs, such as right, left, up, down, user election, or character position and velocity information, etc.) to the online virtual experience server 1502. Subsequent to receiving control instructions from the client devices 1510, the online virtual experience server 1502 may send experience instructions (e.g., position and velocity information of the characters participating in the group experience or commands, such as rendering commands, collision commands, etc.) to the client devices 1510 based on control instructions. For instance, the online virtual experience server 1502 may perform one or more logical operations (e.g., using virtual experience engine 1504) on the control instructions to generate experience instruction(s) for the client devices 1510. In other instances, online virtual experience server 1502 may pass one or more or the control instructions from one client device 1510 to other client devices (e.g., from client device 1510*a* to client device 1510*b*) participating in the virtual experience 1506. The client devices 1510 may use the experience instructions and render the virtual experience for presentation on the displays of client devices 1510.

In some implementations, the control instructions may refer to instructions that are indicative of actions of a user's character within the virtual experience. For example, control instructions may include user input to control action within the experience, such as right, left, up, down, user selection, gyroscope position and orientation data, force sensor data, etc. The control instructions may include character position and velocity information. In some implementations, the control instructions are sent directly to the online virtual experience server 1502. In other implementations, the control instructions may be sent from a client device 1510 to another client device (e.g., from client device 1510*b* to client device 1510*n*), where the other client device generates experience instructions using the local virtual experience engine 1504. The control instructions may include instructions to play a voice communication message or other sounds from another user on an audio device (e.g., speakers, headphones, etc.), for example voice communications or other sounds generated using the audio spatialization techniques as described herein.

In some implementations, experience instructions may refer to instructions that enable a client device 1510 to render a virtual experience, such as a multiparticipant virtual experience. The experience instructions may include one or more of user input (e.g., control instructions), character position and velocity information, or commands (e.g., physics commands, rendering commands, collision commands, etc.).

In some implementations, characters (or virtual experience objects generally) are constructed from components, one or more of which may be selected by the user, that automatically join together to aid the user in editing.

In some implementations, a character is implemented as a 3D model and includes a surface representation used to draw the character (also known as a skin or mesh) and a hierarchical set of interconnected bones (also known as a skeleton or rig). The rig may be utilized to animate the character and to simulate motion and action by the character. The 3D model may be represented as a data structure, and one or more parameters of the data structure may be modified to change various properties of the character, e.g., dimensions (height, width, girth, etc.); body type; movement style; number/type of body parts; proportion (e.g., shoulder and hip ratio); head size; etc. is provided as illustration. In some implementations, any number of client devices 1510 may be used.

In some implementations, each client device 1510 may include an instance of the virtual experience application 1512, respectively. In one implementation, the virtual experience application 1512 may permit users to use and interact with online virtual experience server 1502, such as control a virtual character in a virtual experience hosted by online virtual experience server 1502, or view or upload content, such as virtual experiences 1506, images, video items, web pages, documents, and so forth. In one example, the virtual experience application may be a web application (e.g., an application that operates in conjunction with a web browser) that can access, retrieve, present, or navigate content (e.g., virtual character in a virtual environment, etc.) served by a web server. In another example, the virtual experience application may be a native application (e.g., a mobile application, app, virtual experience program, or a gaming program) that is installed and executes local to client device 1510 and allows users to interact with online virtual experience server 1502. The virtual experience application may render, display, or present the content (e.g., a web page, a media viewer) to a user. In an implementation, the virtual experience application may also include an embedded media player (e.g., a Flash® or HTML5 player) that is embedded in a web page.

According to aspects of the disclosure, the virtual experience application may be an online virtual experience server application for users to build, create, edit, upload content to the online virtual experience server 1502 as well as interact with online virtual experience server 1502 (e.g., engage in virtual experiences 1506 hosted by online virtual experience server 1502). As such, the virtual experience application may be provided to the client device(s) 1510 by the online virtual experience server 1502. In another example, the virtual experience application may be an application that is downloaded from a server.

In some implementations, each developer device 1530 may include an instance of the virtual experience application 1532, respectively. In one implementation, the virtual experience application 1532 may permit a developer user(s) to use and interact with online virtual experience server 1502, such as control a virtual character in a virtual experience hosted by online virtual experience server 1502, or view or upload content, such as virtual experiences 1506, images, video items, web pages, documents, and so forth. In one example, the virtual experience application may be a web application (e.g., an application that operates in conjunction with a web browser) that can access, retrieve, present, or navigate content (e.g., virtual character in a virtual environment, etc.) served by a web server. In another example, the virtual experience application may be a native application (e.g., a mobile application, app, virtual experience program, or a gaming program) that is installed and executes local to developer device 1530 and allows users to interact with online virtual experience server 1502. The virtual experience application may render, display, or present the content (e.g., a web page, a media viewer) to a user. In an implementation, the virtual experience application may also include an embedded media player (e.g., a Flash® or HTML5 player) that is embedded in a web page.

According to aspects of the disclosure, the virtual experience application 1532 may be an online virtual experience server application for users to build, create, edit, upload content to the online virtual experience server 1502 as well as interact with online virtual experience server 1502 (e.g., provide and/or engage in virtual experiences 1506 hosted by online virtual experience server 1502). As such, the virtual experience application may be provided to the developer device(s) 1530 by the online virtual experience server 1502. In another example, the virtual experience application 1532 may be an application that is downloaded from a server. Virtual experience application 1532 may be configured to interact with online virtual experience server 1502 and obtain access to user credentials, user currency, etc. for one or more virtual experiences 1506 developed, hosted, or provided by a virtual experience developer.

In some implementations, a user may login to online virtual experience server 1502 via the virtual experience application. The user may access a user account by providing user account information (e.g., username and password) where the user account is associated with one or more characters available to participate in one or more virtual experiences 1506 of online virtual experience server 1502. In some implementations, with appropriate credentials, a virtual experience developer may obtain access to virtual experience virtual objects, such as in-platform currency (e.g., virtual currency), avatars, special powers, accessories, that are owned by or associated with other users.

In general, functions described in one implementation as being performed by the online virtual experience server 1502 can also be performed by the client device(s) 1510, or a server, in other implementations if appropriate. In addition, the functionality attributed to a particular component can be performed by different or multiple components operating together. The online virtual experience server 1502 can also be accessed as a service provided to other systems or devices through suitable application programming interfaces (APIs), and thus is not limited to use in websites.

Figure 16:
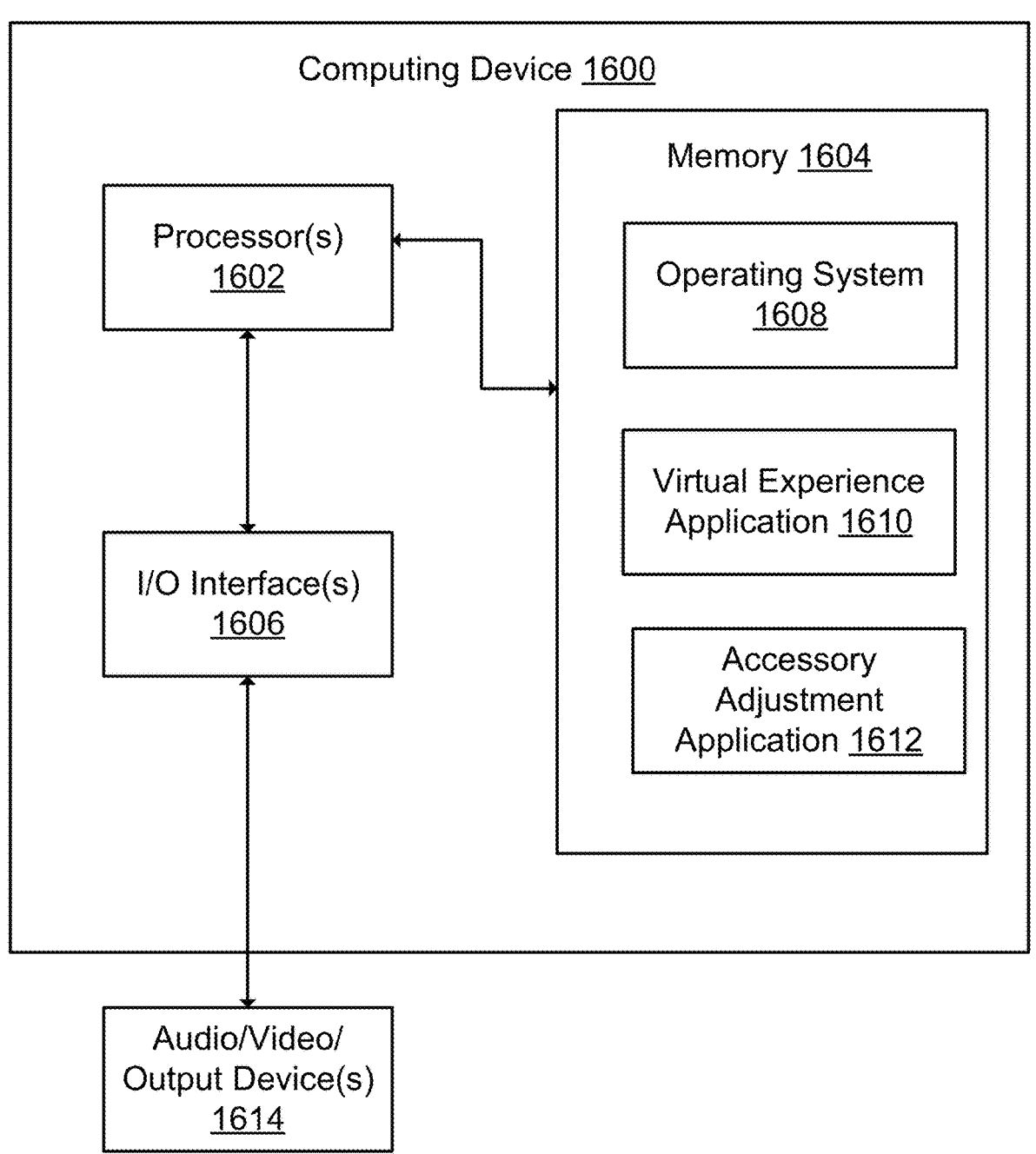
FIG. 16 is a block diagram that illustrates an example computing device which may be used to implement one or more features described herein, in accordance with some implementations.

FIG. 16—Example Computing Device

FIG. 16 is a block diagram that illustrates an example computing device 1600 which may be used to implement one or more features described herein, in accordance with some implementations. In one example, computing device 1600 may be used to implement a computer device (e.g., 1502 and/or 1510 of FIG. 15), and perform appropriate method implementations described herein. Computing device 1600 can be any suitable computer system, server, or other electronic or hardware device. For example, the computing device 1600 can be a mainframe computer, desktop computer, workstation, portable computer, or electronic device (portable device, mobile device, cell phone, smartphone, tablet computer, television, TV set top box, personal digital assistant (PDA), media player, game device, wearable device, etc.). In some implementations, computing device 1600 includes a processor 1602, a memory 1604, input/output (I/O) interface 1606, and audio/video input/output devices 1614.

Processor 1602 can be one or more processors and/or processing circuits to execute program code and control basic operations of the computing device 1600. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 1604 is typically provided in computing device 1600 for access by the processor 1602, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 1602 and/or integrated therewith. Memory 1604 can store software operating on the computing device 1600 by the processor 1602, including an operating system 1608, a virtual experience application 1610, an accessory adjustment application 1612, and other applications (not shown). In some implementations, virtual experience application 1610 and/or accessory adjustment application 1612 can include instructions that enable processor 1602 to perform the functions (or control the functions of) described herein, e.g., some or all of the methods described with respect to FIGS. 7-9.

For example, virtual experience application 1610 can include an accessory adjustment application 1612, which as described herein can allow developers and users to adjust position, rotation, and scale of accessories within an online virtual experience server (e.g., 1502). Elements of software in memory 1604 can alternatively be stored on any other suitable storage location or computer-readable medium. In addition, memory 1604 (and/or other connected storage device(s)) can store instructions and data used in the features described herein. Memory 1604 and any other type of storage (magnetic disk, optical disk, magnetic tape, or other tangible media) can be considered "storage" or "storage devices."

I/O interface 1606 can provide functions to enable interfacing the computing device 1600 with other systems and devices. For example, network communication devices, storage devices (e.g., memory and/or data store 1520), and input/output devices can communicate via I/O interface 1606. In some implementations, the I/O interface can connect to interface devices including input devices (keyboard, pointing device, touchscreen, microphone, camera, scanner, etc.) and/or output devices (display device, speaker devices, printer, motor, etc.).

The audio/video input/output devices 1614 can include a user input device (e.g., a mouse, etc.) that can be used to receive user input, a display device (e.g., screen, monitor, etc.) and/or a combined input and display device, that can be used to provide graphical and/or visual output.

For ease of illustration, FIG. 16 shows one block for each of processor 1602, memory 1604, I/O interface 1606, and software blocks of operating system 1608, virtual experience application 1610, and accessory adjustment application 1612. These blocks may represent one or more processors or processing circuitries, operating systems, memories, I/O interfaces, applications, and/or software engines. In other implementations, computing device 1600 may not have all of the components shown and/or may have other elements including other types of elements instead of, or in addition to, those shown herein. While the online virtual experience server 1502 is described as performing operations as described in some implementations herein, any suitable component or combination of components of online virtual experience server 1502 or similar system, or any suitable processor or processors associated with such a system, may perform the operations described.

A user device can also implement and/or be used with features described herein. Example user devices can be computer devices including some similar components as the computing device 1600, e.g., processor(s) 1602, memory 1604, and I/O interface 1606. An operating system, software and applications suitable for the client device can be provided in memory and used by the processor. The I/O interface for a client device can be connected to network communication devices, as well as to input and output devices, e.g., a microphone for capturing sound, a camera for capturing images or video, a mouse for capturing user input, a gesture device for recognizing a user gesture, a touchscreen to detect user input, audio speaker devices for outputting sound, a display device for outputting images or video, or other output devices. A display device within the audio/video input/output devices 1614, for example, can be connected to (or included in) the computing device 1600 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein (e.g., methods 700, 800, and 900) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g., Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating systems.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

The functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method to provide rigid accessory adjustment for an avatar body in a three-dimensional (3D) virtual environment, the computer-implemented method comprising:

providing an avatar in the 3D virtual environment, the avatar having the avatar body;

providing a rigid accessory for the avatar body, wherein the rigid accessory is attached to the avatar body and the rigid accessory is associated with an accessory type;

identifying constraints for the rigid accessory based at least in part on the accessory type;

performing at least one adjustment from the group comprising:

adjusting a position of the rigid accessory relative to the avatar body, adjusting a rotation of the rigid accessory relative to the avatar body, adjusting a scale of the rigid accessory relative to the avatar body, and a combination thereof, wherein the constraints limit the at least one adjustment; and animating the avatar body, wherein the rigid accessory for the avatar body animates in correspondence with the animated avatar body.

2. The computer-implemented method of claim 1, further comprising analyzing the at least one adjustment to remove abusive adjustments to the rigid accessory.

3. The computer-implemented method of claim 1, wherein performing the at least one adjustment comprises performing at least two adjustments, and wherein each adjustment is performed independently from other adjustments.

4. The computer-implemented method of claim 1, wherein the position of the rigid accessory and the rotation of the rigid accessory are adjusted by modifying a frame of the rigid accessory, the position of the rigid accessory is associated with adjustments along at least one of an x-axis, a y-axis, and a z-axis, and the rotation of the rigid accessory is associated with adjustments along at least one of: the x-axis, the y-axis, and the z-axis.

5. The computer-implemented method of claim 1, wherein the scale of the rigid accessory is adjusted by changing a size of the rigid accessory, wherein performing the adjustment to the scale of the rigid accessory is associated with uniform adjustments along an x-axis, a y-axis, and a z-axis.

6. The computer-implemented method of claim 1, wherein the rigid accessory is associated with an asset ID in the 3D virtual environment and the at least one adjustment is stored as metadata in a field associated with the rigid accessory in the 3D virtual environment using the asset ID.

7. The computer-implemented method of claim 6, wherein the at least one adjustment is accessed by retrieving the stored metadata in the field associated with the rigid accessory in the 3D virtual environment using the asset ID, wherein the animating comprises using the stored metadata to animate the rigid accessory in correspondence with the animated avatar body.

8. The computer-implemented method of claim 6, wherein the at least one adjustment of the position, the rotation, or the scale is stored as the metadata as a percentage of a corresponding allowed adjustment and as absolute values of limits of a corresponding adjustment according to a distance measure in the 3D virtual environment.

9. The computer-implemented method of claim 8, further comprising animating the rigid accessory in correspondence with the animated avatar body, wherein animating the rigid accessory is performed based on the percentage of the corresponding allowed adjustment and the absolute values of the limits of the corresponding adjustment according to the distance measure in the 3D virtual environment in the metadata.

10. A non-transitory computer-readable medium with instructions stored thereon that, responsive to execution by a processing device, cause the processing device to perform operations comprising:

providing an avatar in a 3D virtual environment, the avatar having an avatar body;

providing a rigid accessory for the avatar body, wherein the rigid accessory is attached to the avatar body and the rigid accessory is associated with an accessory type;

identifying constraints for the rigid accessory based at least in part on the accessory type;

performing at least one adjustment from the group comprising:

adjusting a position of the rigid accessory relative to the avatar body, adjusting a rotation of the rigid accessory relative to the avatar body, adjusting a scale of the rigid accessory relative to the avatar body, and a combination thereof, wherein the constraints limit the at least one adjustment; and animating the avatar body, wherein the rigid accessory for the avatar body animates in correspondence with the animated avatar body.

11. The non-transitory computer-readable medium of claim 10, the operations further comprising analyzing the at least one adjustment to remove abusive adjustments to the rigid accessory.

12. The non-transitory computer-readable medium of claim 10, wherein performing the at least one adjustment comprises performing at least two adjustments, and wherein each adjustment is performed independently from other adjustments.

13. The non-transitory computer-readable medium of claim 10, wherein the rigid accessory is associated with an asset ID in the 3D virtual environment and the at least one adjustment is stored as metadata in a field associated with the rigid accessory in the 3D virtual environment using the asset ID.

14. A system, comprising: a memory with instructions stored thereon; and a processing device, coupled to the memory, the processing device configured to access the memory and execute the instructions, wherein the instructions cause the processing device to perform operations comprising:

providing an avatar in a 3D virtual environment, the avatar having an avatar body;

providing a rigid accessory for the avatar body, wherein the rigid accessory is attached to the avatar body and the rigid accessory is associated with an accessory type;

identifying constraints for the rigid accessory based at least in part on the accessory type;

performing at least one adjustment from the group comprising:

adjusting a position of the rigid accessory relative to the avatar body, adjusting a rotation of the rigid accessory relative to the avatar body, adjusting a scale of the rigid accessory relative to the avatar body, and a combination thereof, wherein the constraints limit the at least one adjustment; and animating the avatar body, wherein the rigid accessory for the avatar body animates in correspondence with the animated avatar body.

15. The system of claim 14, the operations further comprising analyzing the at least one adjustment to remove abusive adjustments to the rigid accessory.

16. The system of claim 14, wherein performing the at least one adjustment comprises performing at least two adjustments, and wherein each adjustment is performed independently from other adjustments.

17. The system of claim 14, wherein the rigid accessory is associated with an asset ID in the 3D virtual environment and the at least one adjustment is stored as metadata in a field associated with the rigid accessory in the 3D virtual environment using the asset ID.

* * * * *